United States Patent
Xu et al.

(10) Patent No.: US 8,433,101 B2
(45) Date of Patent: Apr. 30, 2013

(54) SYSTEM AND METHOD FOR WAVING DETECTION BASED ON OBJECT TRAJECTORY

(75) Inventors: Ning Xu, Irvine, CA (US); Haiying Guan, Bethesda, MD (US)

(73) Assignee: Samsung Electronics Co., Ltd., Suwon, Gyeonggi-Do (KR)

( * ) Notice: Subject to any disclaimer, the term of this patent is extended or adjusted under 35 U.S.C. 154(b) by 537 days.

(21) Appl. No.: 12/183,994

(22) Filed: Jul. 31, 2008

(65) Prior Publication Data

US 2010/0027846 A1 Feb. 4, 2010

(51) Int. Cl.
*G06K 9/00* (2006.01)
(52) U.S. Cl.
USPC .......................... 382/107; 382/103; 345/156
(58) Field of Classification Search .................. None
See application file for complete search history.

(56) References Cited

U.S. PATENT DOCUMENTS

| | | | |
|---|---|---|---|
| 5,111,516 A | 5/1992 | Nakano et al. | |
| 5,454,043 A * | 9/1995 | Freeman | 382/168 |
| 5,548,661 A | 8/1996 | Price et al. | |
| 5,594,469 A | 1/1997 | Freeman et al. | |
| 5,790,692 A | 8/1998 | Price et al. | |
| 6,647,131 B1 | 11/2003 | Bradski | |
| 6,654,483 B1 | 11/2003 | Bradski | |
| 7,099,505 B2 | 8/2006 | Li et al. | |
| 7,155,038 B2 * | 12/2006 | Kiyono et al. | 382/122 |
| 7,199,803 B2 | 4/2007 | Shin et al. | |
| 7,200,266 B2 | 4/2007 | Ozer et al. | |
| 7,245,767 B2 | 7/2007 | Moreno et al. | |
| 2005/0053284 A1 | 3/2005 | Lui et al. | |
| 2006/0013440 A1 | 1/2006 | Cohen et al. | |
| 2006/0245497 A1 | 11/2006 | Tourapis et al. | |
| 2007/0031014 A1 | 2/2007 | Soderberg et al. | |
| 2007/0093942 A1 * | 4/2007 | Happel | 700/294 |
| 2008/0166022 A1 * | 7/2008 | Hildreth | 382/107 |
| 2008/0267447 A1 * | 10/2008 | Kelusky et al. | 382/100 |
| 2009/0016540 A1 | 1/2009 | Heningsen Nielsen et al. | |
| 2009/0051648 A1 * | 2/2009 | Shamaie et al. | 345/156 |
| 2009/0079813 A1 * | 3/2009 | Hildreth | 348/14.03 |
| 2009/0274339 A9 * | 11/2009 | Cohen et al. | 382/103 |
| 2009/0315740 A1 * | 12/2009 | Hildreth et al. | 341/20 |
| 2010/0040292 A1 * | 2/2010 | Clarkson | 382/201 |
| 2010/0050134 A1 | 2/2010 | Clarkson | |
| 2010/0234077 A1 * | 9/2010 | Yoo et al. | 345/179 |

OTHER PUBLICATIONS

O. Jenkins, G. González, and M. Loper. "Tracking human motion and actions for interactive robots". In Human-Robot Interaction (HRI 2007), pp. 365-372, Arlington, VA, USA, Mar. 2007.*
Freeman, W. T., et al., Television control by hand gestures, Mitsubishi Electric Research Laboratory, TR94-24, Dec. 1994.*

(Continued)

*Primary Examiner* — Vu Le
*Assistant Examiner* — Xuemei Chen

(57) ABSTRACT

A system and method for detecting a waving motion from a sequence of ordered points is disclosed. In one embodiment, the method comprising receiving a sequence of ordered points, selecting a subset of the sequence of ordered points, determining if the subset defines a circular shape, and storing an indication of whether or not the subset defines a waving motion. Various metrics for determining if the subset defines a waving motion, which allow for a trade-off between accuracy and complexity, are disclosed.

16 Claims, 21 Drawing Sheets

OTHER PUBLICATIONS

R.O. Duda, P.E. Hart, "Use of the Hough Transformation to Detect Lines and Curves in Pictures", Communications of the ACM 15 (1972) 11-15.

D. H. Ballard, "Generalizing the Hough transform to detect arbitrary shapes." Pattern Recognition, v. 13, n. 2, pp. 111-122, 1981.

T. J. Atherton and D. J. Kerbyson, "Size invariant circle detection", Image and Vision Computing, vol. 17, pp. 795-803, 1999.

E. Borenstein, E. Sharon, and S. Ulman. Combining top-down and bottom-up segmentation. *CVPR POCV*, Washington, 2004.

E. Borenstein and S. Ulman. Class-specific, top-down segmentation. In *ECCV* (2), pp. 109-124, 2002.

E. Borenstein and J. Malik. Shape guided object segmentation. In *IEEE Conference on Computer Vision and Pattern Recognition*, pp. 969-976, 2006.

Yuri Boykov, Olga Veksler, and Ramin Zabih. Fast approximate energy minimization via graph cuts. *IEEE Transactions on Pattern Analysis and Machine Intelligence*, Nov. 2001.

Piotr Dollar, Zhuowen Tu, and Serge Belongie. Supervised learning of edges and object boundaries. *IEEE Conference on Computer Vision and Pattern Recognition*, Jun. 2006.

Pedro F. Felzenszwalb. Efficient graph-based image segmentation. In *International Journal of Computer Vision*, Sep. 2004.

J. Friedman, T. Hastie, and R. Tibshirani. Additive logic regression: a statistical view of boosting. *Annals of Statistical*, 2000.

Frank R. Kschischang, Brendan J. Frey, and Hans-Andrea Loeliger. Factor graphs and the sun-product algorithm. *IEEE Transactions on Information Theory*, vol. 47(2): 498-519, Feb. 2001.

L. Liu and S. Sclaroff. Region segmentation via deformable model-guided split and merge. *ICCV*(1), 2001.

Jordan Reynolds and Kevin Murphy. Figure-ground segmentation using a hierarchical conditional random field. In *Fourth Canadian Conference on Computer and Robot Vision*, pp. 175-182, 2007.

J. Shi and J. Malik. Normalized cuts and image segmentation. In *IEEE Conference on Computer Vision and Pattern Recognition*, pp. 731-737, 1997.

Antonio Torralba, Kevin P. Murphy, and William T. Freeman. Sharing visual features for multiclass and multiview object detection. *IEEE Transactions on Pattern Analysis and Machine Intelligence*, vol. 29, No. 5, May 2007.

Z. Tu. Probabilistic boosting-tree: Learning discriminative models for classification, recognition, and clustering. *ICCV*, 2005.

Y. Weiss. Segmentation using eigenvectors: A unifying view. In *International Conference on Computer Vision* (2), pp. 975-982, 1999.

J. Winn, A. Criminisi, and T. Minka. Object categorization by learned universal visual dictionary. *IEEE Conference on Computer Vision and Pattern Recognition*, 2005.

Carson, "Approximating a circle with a Polygon", "Mission Data Blog", Apr. 17, 2006, p. 5 Publisher: Retrieved from Internet.

Goldberg, "What every computer scientist should know about floating-point arithmetic", "Journal ACM Computing Surveys", Mar. 1991, pp. 5-48, vol. 23, No. 1, Publisher: (CSUR).

"Exterior Angles of Polygons", "Downloaded from the Internet", 2011, p. 1 Publisher: Math is Fun.

Shan et al., "Gesture Recognition Using Temporal Template Based Trajectories", 2004, pp. 954-957, Publisher: The Computer Society, Published in: Beijing, China.

\* cited by examiner

|    | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |    |
|----|---|---|---|---|---|---|---|---|---|---|----|----|----|----|----|----|----|----|----|----|----|----|----|----|----|
| 0  | 0 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 0  |
| 1  | 1 | 1 | 1 | 0 | 0 | 0 | 0 | 0 | 0 | 0 | 0  | 0  | 1  | 1  | 1  | 1  | 0  | 0  | 0  | 0  | 0  | 0  | 0  | 0  | 0  |
| 2  | 0 | 0 | 0 | 0 | 1 | 1 | 1 | 0 | 0 | 1 | 1  | 1  | 1  | 1  | 1  | 1  | 0  | 1  | 1  | 1  | 0  | 0  | 0  | 0  | 1  |
| 3  | 0 | 0 | 0 | 0 | 0 | 0 | 1 | 1 | 1 | 1 | 0  | 1  | 1  | 1  | 1  | 1  | 1  | 1  | 1  | 0  | 0  | 0  | 0  | 0  | 1  |
| 4  | 0 | 0 | 0 | 1 | 1 | 1 | 1 | 1 | 1 | 0 | 0  | 0  | 1  | 1  | 1  | 1  | 0  | 0  | 0  | 0  | 0  | 0  | 0  | 0  | 1  |
| 5  | 0 | 0 | 0 | 0 | 0 | 0 | 1 | 1 | 1 | 1 | 1  | 0  | 0  | 0  | 0  | 0  | 1  | 1  | 0  | 0  | 0  | 0  | 0  | 0  | 1  |
| 6  | 0 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 1  |
| 7  | 0 | 0 | 0 | 0 | 0 | 0 | 0 | 1 | 1 | 1 | 1  | 1  | 0  | 0  | 0  | 0  | 0  | 0  | 0  | 0  | 0  | 1  | 0  | 0  | 0  |
| 8  | 0 | 0 | 0 | 0 | 0 | 1 | 1 | 1 | 1 | 1 | 0  | 0  | 1  | 0  | 0  | 0  | 0  | 0  | 0  | 1  | 0  | 0  | 0  | 0  | 1  |
| 9  | 0 | 0 | 0 | 0 | 1 | 1 | 1 | 1 | 1 | 1 | 1  | 1  | 1  | 0  | 0  | 0  | 0  | 0  | 0  | 0  | 0  | 0  | 0  | 0  | 1  |
| 10 | 0 | 0 | 0 | 0 | 0 | 0 | 0 | 0 | 0 | 0 | 0  | 0  | 0  | 0  | 0  | 1  | 0  | 0  | 0  | 0  | 0  | 1  | 0  | 0  | 0  |

FIG. 11

SYSTEM AND METHOD FOR WAVING DETECTION BASED ON OBJECT TRAJECTORY

CROSS-REFERENCE TO RELATED APPLICATIONS

This application relates to U.S. patent application No. 12/184,008 filed Jul. 31, 2008 entitled "System and method for circling detection based on object trajectory," and U.S. patent application No. 12/183,973 filed Jul. 31, 2008 entitled "System and method for motion detection based on object trajectory," concurrently filed with this application, which are herein incorporated by reference in their entirety.

BACKGROUND

1. Field

This disclosure relates to the detection of a gesture in a sequence of ordered points, and in particular relates to the use of such a detection to control a media device.

2. Description of the Related Technology

Initially, televisions were controlled using predefined function buttons located on the television itself. Wireless remote controls were then developed to allow users to access functionality of the television without needing to be within physical reach of the television. However, as televisions have become more feature-rich, the number of buttons on remote controls has increased correspondingly. As a result, users have been required to remember, search, and use a large number of buttons in order to access the full functionality of the device. More recently, the use of hand gestures has been proposed to control virtual cursors and widgets in computer displays. These approaches suffer from problems of user unfriendliness and computational overhead requirements.

Two types of gestures which may be useful include a circling gesture and a waving gesture. Detecting circles from a digital image is very important in applications such as those involving shape recognition. The most well-known methods for accomplishing circle detection involve application of the Generalized Hough Transform (HT). However, the input of Hough Transform-based circle detection algorithms is a two-dimensional image, i.e. a matrix of pixel intensities. Similarly, prior methods of detecting of a waving motion in a series of images, such as a video sequence, have been limited to using time series of intensity values. One method of detecting the motion of a waving hand involves detecting a periodic intensity change with a Fast Fourier Transform (FFT). Methods of detecting a gesture, such as a circular shape or a waving motion, from a set of ordered points have not been forthcoming.

SUMMARY OF CERTAIN INVENTIVE ASPECTS

One aspect of the development is a computer-implemented method of detecting a waving motion in a sequence of ordered points, the method comprising receiving a sequence of ordered points, selecting a subset of the sequence of ordered points, determining if the subset defines a waving motion, and storing an indication of whether or not the subset defines a waving motion.

Another aspect of the development is a system for detecting a waving motion in a sequence of ordered points, the system comprising an input configured to receive a sequence of ordered points, a selection module configured to select a subset of the sequence of ordered points, a determination module configured to determine if the subset defines a waving motion, and a memory configured to store an indication of whether or not the subset defines a waving motion.

Still another aspect of the development is a system for detecting a waving motion in a sequence of ordered points, the system comprising means for receiving a sequence of ordered points, means for selecting a subset of the sequence of ordered points, means for determining if the subset defines a waving motion, and means for storing an indication of whether or not the subset defines a waving motion.

Yet another aspect of the development is a programmable storage device comprising code which, when executed, causes a processor to perform a method of detecting a waving motion in a sequence of ordered points, the method comprising receiving a sequence of ordered points, selecting a subset of the sequence of ordered points, determining if the subset defines a circular shape, and storing an indication of whether or not the subset defines a waving motion.

BRIEF DESCRIPTION OF THE DRAWINGS

FIG. 11 is a diagram of a binary map which may be utilized in performing one or more of the methods described herein.

FIG. 13a is an exemplary row of a motion history image.

FIG. 13b is diagram which represents the row of the motion history image of FIG. 13a as monotonic segments.

FIG. 13c is a diagram illustrating two segments derived from the row of the motion history image of FIG. 13a.

FIG. 13d is a diagram illustrating a plurality of segments derived from an exemplary motion history image.

DETAILED DESCRIPTION OF CERTAIN EMBODIMENTS

The following detailed description is directed to certain specific sample aspects of the development. However, the development can be embodied in a multitude of different ways as defined and covered by the claims. In this description, reference is made to the drawings wherein like parts are designated with like numerals throughout.

Control of media devices, such as televisions, cable boxes, or DVD players, is often accomplished by the user of such devices through the use of a remote control. However, such a remote control is often frustratingly complex and easily misplaced, forcing the user from the comfort of their viewing position to either attempt to find the remote or to manually change system parameters by interacting physically with the device itself.

Recent developments in digital imagery, digital video, and computer processing speed have enabled real-time human-machine interfaces that do not require additional hardware outside of the device, as described in U.S. patent application Ser. No. 12/037033, entitled "System and method for television control using hand gestures," filed Feb. 25, 2008, which is herein incorporated by reference in its entirety.

System Overview

Figure 1:
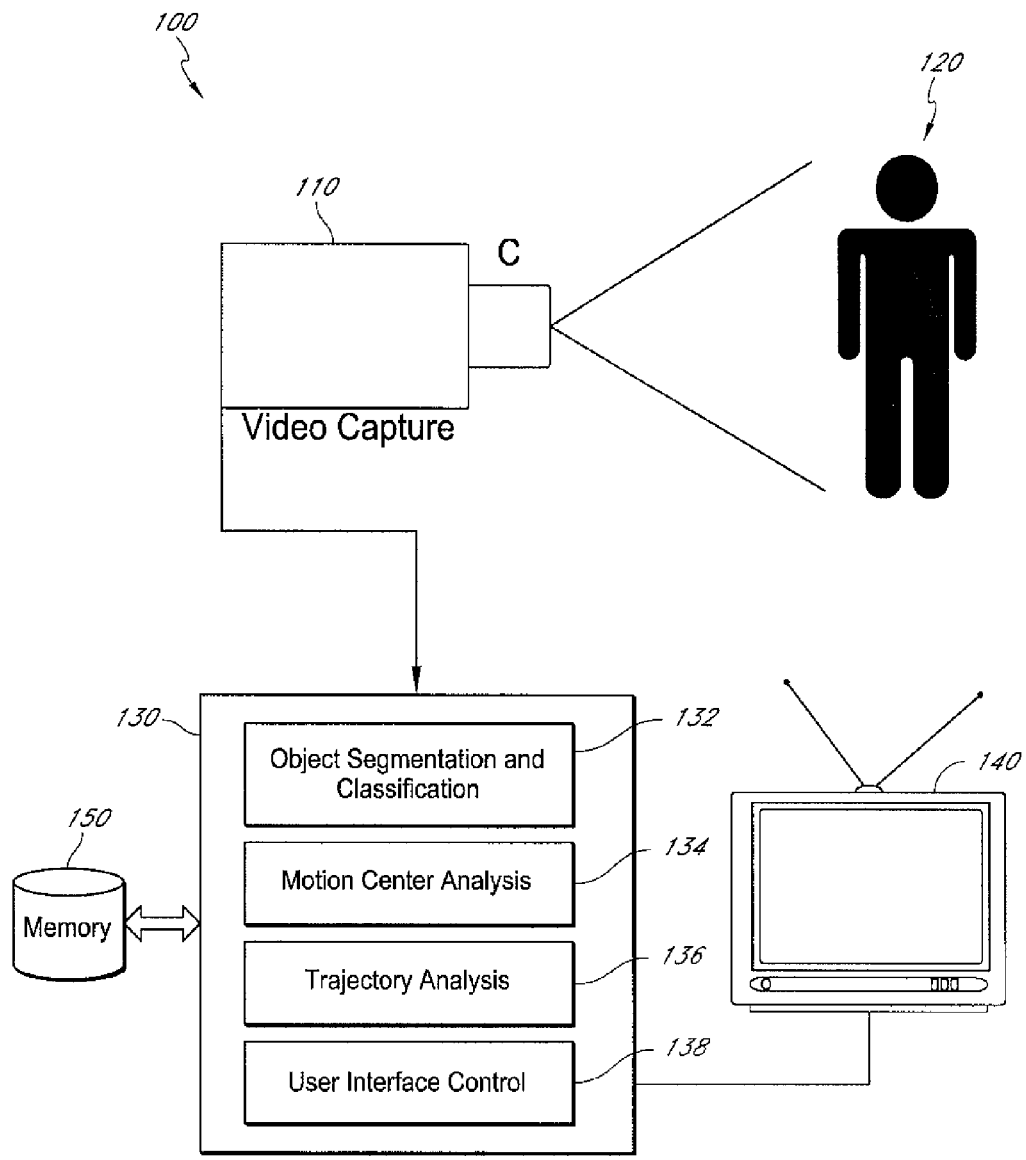
FIG. 1 is a functional block diagram of an exemplary computer vision system utilizing an embodiment of gesture detection for control of a device via a human-machine interface.

An exemplary embodiment of a human-machine interface that does not require additional hardware outside of the device is described with respect to FIG. 1. FIG. 1 is a functional block diagram of an exemplary computer vision system utilizing an embodiment of circular shape detection for control of a device via a human-machine interface. The system 100 is configured to interpret hand gestures from a user 120. The system 100 comprises a video capture device 110 to capture video of hand gestures performed by the user 120. In some embodiments, the video capture device 110 may be controllable such that the user 120 being surveyed can be in various places or positions. In other embodiments, the video capture device 110 is static and the hand gestures of the user 120 must be performed within the field of view of the video capture device 110. The video (or image) capture device 110 can include cameras of varying complexity such as, for example, a "webcam" as is well-known in the computer field, or more sophisticated and technologically advanced cameras. The video capture device 110 may capture the scene using visible light, infrared light, or another part of the electromagnetic spectrum.

Image data that is captured by the video capture device 110 is communicated to a gesture analysis system 130. The gesture analysis system 130 can comprise a personal computer or other type of computer system including one or more processors. The processor may be any conventional general purpose single- or multi-chip microprocessor such as a Pentium® processor, Pentium II® processor, Pentium III® processor, Pentium IV® processor, Pentium® Pro processor, a 8051 processor, a MIPS® processor, a Power PC® processor, or an ALPHA® processor. In addition, the processor may be any conventional special purpose microprocessor such as a digital signal processor.

The gesture analysis system 130 includes an object and segment classification subsystem 132. In some embodiments, the object segmentation and classification subsystem 132 communicates or stores information indicative of the presence and/or location(s) of a member of an object class that may appear in the field of view of the video capture device 110. For example, one class of objects may be the hands of the user 120. Other classes of objects may also be detected, such as a cell phone or bright orange tennis ball held in the hand of the user. The object segmentation and classification subsystem 132 can identify members of the object class while other non-class objects are in the background or foreground of the captured image.

In some embodiments, the object segmentation and classification subsystem 132 stores information indicative of the presence of a member of the object class in a memory 150 which is in data communications with the gesture analysis system 130. Memory refers to electronic circuitry that allows information, typically computer data, to be stored and retrieved. Memory can refer to external devices or systems, for example, disk drives or tape drives. Memory can also refer to fast semiconductor storage (chips), for example, Random Access Memory (RAM) or various forms of Read Only Memory (ROM), which are directly connected to the one or more processors of the gesture analysis system 130. Other types of memory include bubble memory and core memory.

In one embodiment, the object segmentation and classification subsystem 132 is configured to classify and detect the presence of a hand, or both hands, of the user 120. The information passed on to the rest of the gesture analysis system 130 may comprise, for example, a set of pixel locations for each frame of video, the pixel locations corresponding to the location of the user's hand in the captured image.

Further information concerning object segmentation, classification, and detection is described in U.S. patent application Ser. No. 12/141824, entitled "Systems and methods for class-specific object segmentation and detection," filed Jun. 18, 2008, which is hereby incorporated by reference in its entirety, and which incorporation specifically includes but is not limited to paragraphs [0045]-[0073].

The gesture analysis system 130 also includes a motion center analysis subsystem 134. After receiving information concerning an object from the object segmentation and classification subsystem 132 or the memory 150, the motion center analysis subsystem 134 condenses this information into a simpler representation by assigning a single pixel location to each moving object. In one embodiment, for example, the object segmentation and classification subsystem 132 provides information for each frame of a video sequence describing the hand of the user 120. The motion center analysis subsystem 134 condenses this information into a sequence of points, defining a trajectory of the hand.

Further information concerning motion centers is described in U.S. patent application Ser. No. 12/127,738, entitled "Systems and methods for estimating the centers of moving objects in a video sequence," filed May 27, 2008, which is hereby incorporated by reference in its entirety, and which incorporation specifically includes but is not limited to paragraphs [0027]-[0053].

The gesture analysis system 130 also includes a trajectory analysis subsystem 136 and a user interface control subsystem 138. The trajectory analysis subsystem 136 is configured to analyze the data produced by the other subsystems to determine if the defined trajectory describes one or more predefined motions. For example, after the motion center analysis subsystem 134 provides a set of points corresponding to the motion of the hand of the user 120, the trajectory analysis subsystem 136 analyzes the points to determine if the hand of the user 120 describes a waving motion, a circular motion, or another recognized gesture. The trajectory analysis subsystem 136 may access a gesture database within the memory 150 in which a collection of recognized gestures and/or rules relating to the detection of the recognized gestures are stored. The user interface control subsystem 138 is configured to control parameters of the system 100, e.g., parameters of the device 140, when it is determined that a recognized gesture has been performed. For example, if the trajectory analysis subsystem 136 indicates that the user has performed a circling motion, the system might turn a television on or off. Other parameters, such as the volume or channel of the television, may be changed in response to indentified movements of specific types.

Detection of Gestures in a Video Sequence

Figure 2:
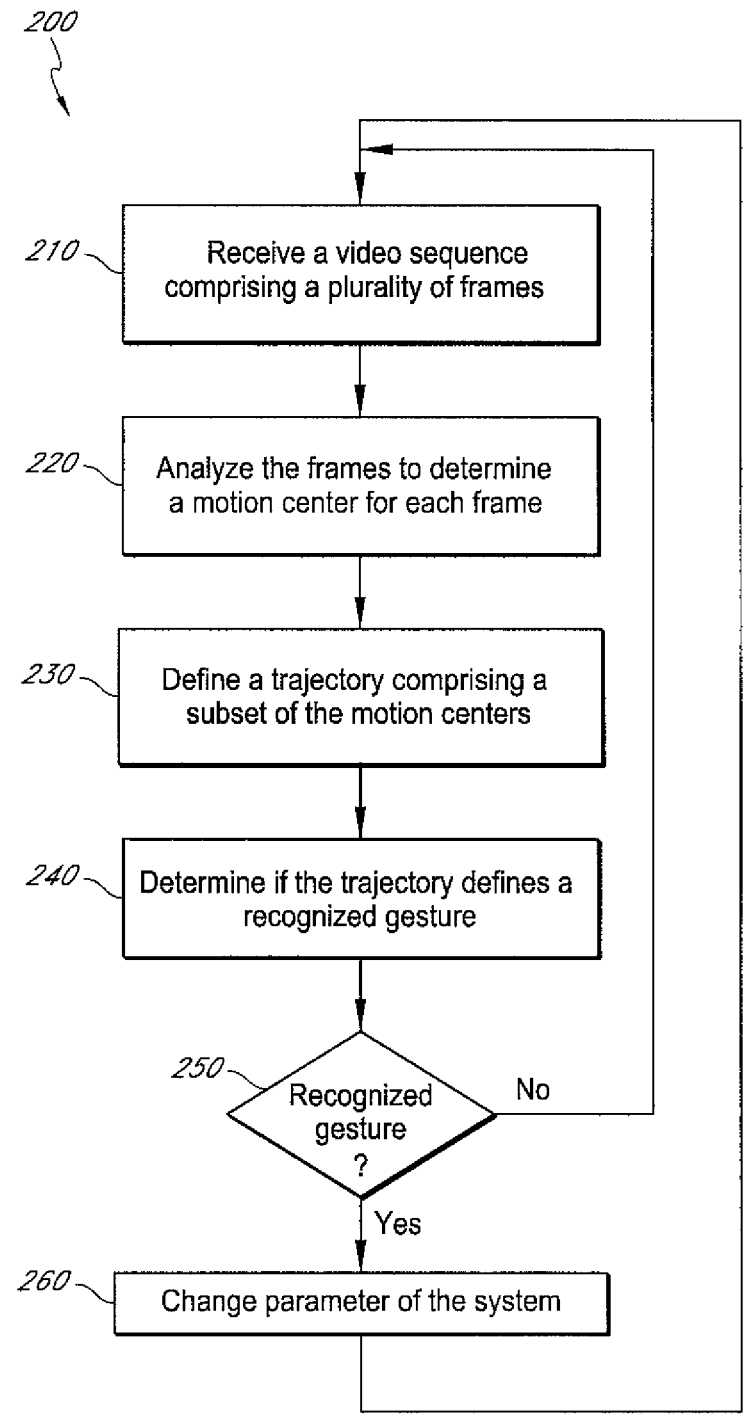
FIG. 2 is a flowchart illustrating a method of controlling a device by analyzing a video sequence.

FIG. 2 is a flowchart illustrating a method of controlling a device by analyzing a video sequence. The procedure 200 begins in block 210, wherein a video sequence comprising a plurality of video frames is received by, e.g., the gesture analysis subsystem 130. The video sequence may be received, for example, via the video capture device 110, or it may be received from the memory 150 or over a network. In some embodiments of the method, the received video sequence is not what is recorded by the video capture device 110, but a processed version of the video data. For example, the video sequence may comprise a subset of the video data, such as every other frame or every third frame. In other embodiments, the subset may comprise selected frames as processing power permits. In general, a subset may include only one element of the set, at least two elements of the set, at least three elements of the set, a significant portion (e.g. at least 10%, 20%, 30%) of the elements of the set, a majority of the elements of the set, nearly all (e.g., at least 80%, 90%, 95%) of the elements of the set, or all of the elements of the set. Additionally, the video sequence may comprise the video data subjected to image and/or video processing techniques such as filtering, desaturation, and other image processing techniques known to those skilled in the art.

Another form of processing that may be applied to the video data is object detection, classification, and masking. Frames of the video may be analyzed such that every pixel location that is not a member of a specific object class is masked out, e.g., set to zero or simply ignored. In one embodiment, the object class is human hands, and thus a video of a human hand in front of a background image (e.g., the user, a couch, etc.) would be processed such that the result is the user's hand moving in front of a black background.

Next, in block 220, the frames of the video sequence are analyzed to determine a motion center for at least one object in each frame. A motion center is a single location, such as a pixel location or a location in the frame between pixels, which represents the position of the object. In some embodiments, more than one motion center is output for a single frame, each motion center corresponding to a different object. This may enable processing to be performed on gestures requiring two hands. In block 230, a trajectory is defined comprising a subset of the motion centers. In some embodiments, more than one trajectory may be defined for a particular period of the video sequence. Each trajectory is a sequence of ordered points as the frames of the video upon which the motion centers are based are themselves ordered, that is, at least one point of the sequence is successive to (or later than) another point of the sequence.

In block 240, the trajectory is analyzed to determine if the sequence of ordered points defines a recognized gesture. This analysis may require processing of the trajectory to determine a set of parameters based on the trajectory, and then applying one or more rules to the parameters to determine if a recognized gesture has been performed. Specific examples of determining if a trajectory defines a circular shape or a waving motion are disclosed below. Other gestures may include L-shaped gestures, checkmark-shaped gestures, triangular gestures, M-shaped or cycloid gestures, or more complicated gestures involving two hands.

If it is determined, in block 250, that a recognized gesture has been detected, the process 200 proceeds to block 260, where a parameter of the system is changed. As described above, this may be turning on or off a device, such as a television, or changing the channel or volume. The device may be, among other things, a television, a DVD player, a radio, a set-top box, a music player, or a video player. Changed parameters may include a channel, a station, a volume, a track, or a power. The process 200 may be employed in non-media devices as well. For example, through analysis of trajectory, a kitchen sink may be turned on by making a clockwise circular motion detectable by appropriate hardware connected to the sink. Turning the sink off may be accomplished by a counterclockwise motion.

In block 250, if a recognized gesture has not been detected, or after a parameter of the device has been changed, the method returns to block 210 to continue the process 200. In some embodiments, after a recognized gesture has been detected, further gesture analysis is stayed for a predetermined time period, e.g. 2 seconds. For example, if a waving motion has been detected which turns the television on, gesture recognition is delayed for two seconds to prevent further waving from immediately turning the television back off. In other embodiments, or for other gestures, such a delay is unnecessary or undesirable. For example, if a circular shape changes the volume, continued motion defining a circular shape may further increase the volume.

Although the above description has been directed to the detection of a recognized gesture in a sequence of motion centers derived from a video sequence, other embodiments relate to the detection of specific shapes in any sequence of ordered points. Such a set of ordered points may be derived from a computer peripheral, such as a mouse, a touch screen, or a graphics tablet. The set of ordered points may also be derived from analysis of scientific data, such as astronomical orbital data or trajectory of subatomic particles in a bubble chamber. One specific shape which may be detected from a sequence of ordered points is a circular shape. Depending on the parameters chosen in implementing the particular embodiment, the shape detected may be one of many types of shapes, such as a circle, an ellipse, an arc, a spiral, a cardioid, or an approximation thereof.

Object Segmentation and Classification

As described above with respect to FIG. 1, embodiments of the invention comprise a object segmentation and classification subsystem 132. Although the invention is not limited to any particular system for or method of object detection, segmentation, or classification, one embodiment is described in detail below.

Figure 3:
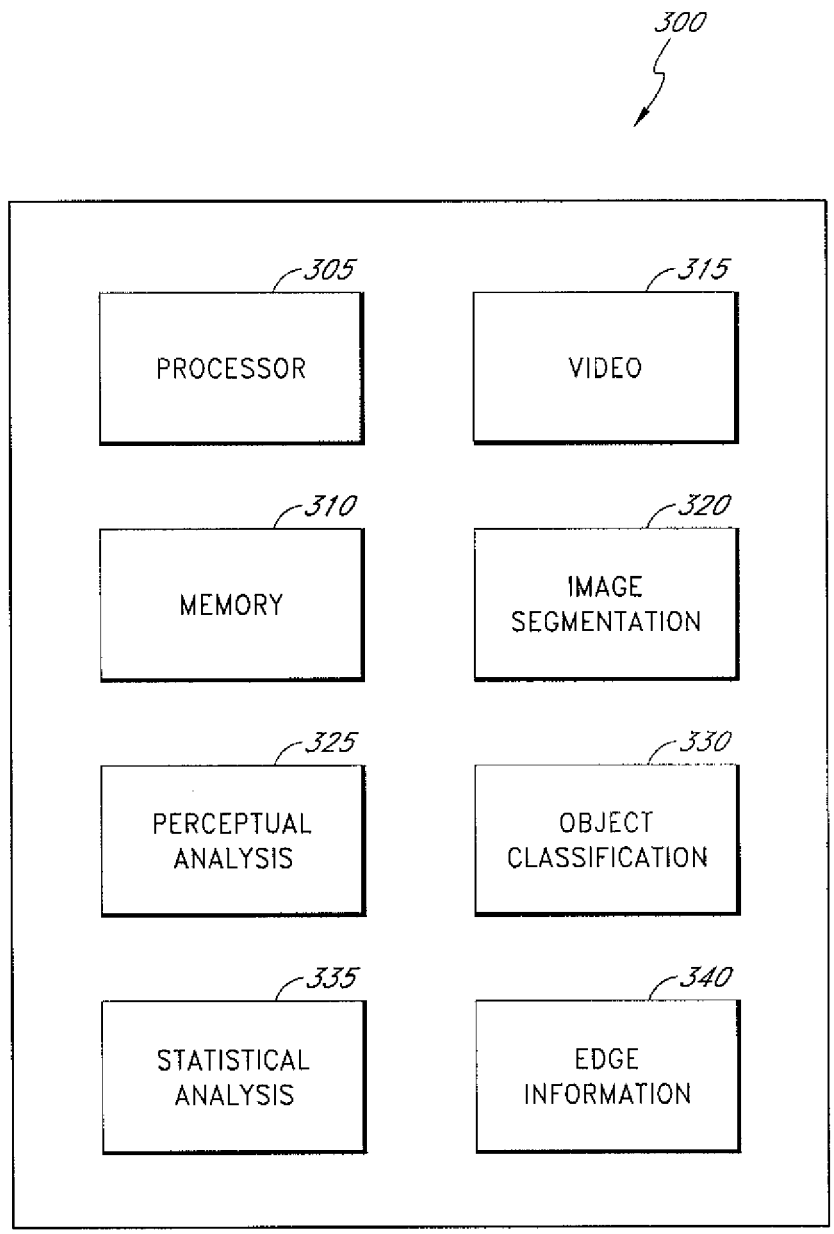
FIG. 3 is a block diagram illustrating an embodiment of an object segmentation and classification subsystem that may be used for the object segmentation and classification subsystem of the gesture analysis system illustrated in FIG. 1.

FIG. 3 is a block diagram illustrating an embodiment of an object segmentation and classification subsystem 300 that may be used for the object segmentation and classification subsystem 132 of the gesture analysis system 130 illustrated in FIG. 1. In this embodiment, the object segmentation and classification subsystem 300 comprises a processor element 305, a memory element 310, a video subsystem 315, an image segmentation subsystem 320, a perceptual analysis subsystem 325, an object classification subsystem 330, a statistical analysis subsystem 335, and an optional edge information subsystem 335. Alternatively, the object segmentation and classification subsystem 300 may be coupled to and use the processor and memory present in the gesture analysis system 130.

The processor 305 may include one or more of a general purpose processor and/or a digital signal processor and/or an application specific hardware processor. The memory 310 may include, for example, one or more of integrated circuits or disk-based storage or any readable and writeable random access memory device. The processor 305 is coupled to the memory 310 and the other elements to perform the various actions of the other elements. In some embodiments, the video subsystem 315 receives video data over a cable or wireless connection such as a local area network, e.g., from the video capture device 110 in FIG. 1. In other embodiments, the video subsystem 315 may obtain the video data directly from the memory element 310 or one or more external memory devices including memory discs, memory cards, internet server memory, etc. The video data may be compressed or uncompressed video data. In the case of compressed video data stored in the memory element 310 or in the external memory devices, the compressed video data may have been created by an encoding device such as the video capture device 110 in FIG. 1. The video subsystem 315 can perform decompression of the compressed video data in order for the other subsystems to work on the uncompressed video data.

The image segmentation subsystem 320 performs tasks associated with segmentation of the image data obtained by the video subsystem 315. Segmentation of the video data can be used to significantly simplify the classification of different objects in an image. In some embodiments, the image segmentation subsystem segments the image data into objects and background present in the scene. One of the main difficulties lies in the definition of segmentation itself. What defines a meaningful segmentation? Or, if it is desirable to segment the image into various objects in the scene, what defines an object? Both questions can be answered when we address the problem of segmenting out objects of a given class, say, human hands, or faces. Then the problem is reduced to one of labeling image pixels into those belonging to objects of the given class and those belonging to the background. Objects of a class come in various poses and appearances. The same object can give different shapes and appearances depending on the pose and lighting in which the image was taken. To segment out an object despite all these variabilities may be a challenging problem. That being said, significant progress has been made in the segmentation algorithms over the past decade.

In some embodiments, the image segmentation subsystem 320 uses a segmentation method known as bottom-up segmentation. The bottom-up segmentation approach, in contrast to segmentation directly into objects of a known class, makes use of the fact that usually intensity, color, and texture discontinuities characterize object boundaries. Therefore one can segment the image into a number of homogeneous regions and then later classify those segments belonging to the object (e.g., using the object classification subsystem 330). This is often done without regard to any particular meaning of the components but only following the uniformity of intensity and color of the component regions and sometimes the shape of the boundaries.

The goal of bottom-up segmentation, generally, is to group perceptually uniform regions in an image together. Considerable progress in this area was achieved by eigenvector-based methods. Examples of eigenvector-based methods are presented in "Normalized cuts and image segmentation, by J. Shi and J. Malik, IEEE Conference on Computeer Vision and Pattern Recognition, pages 731-737, 1997; and "Segmentation using eigenvectors: A unifying view," by Y. Weiss, International Conference on Computer Vision (2), pages 975-982, 1999. These methods can be excessively complicated for some applications. Certain other fast approaches fail to produce perceptually meaningful segmentations. Pedro F. Felzenszwalb developed a graph-based segmentation method (See "Efficient graph-based image segmentation," International Journal of Computer Vision, September 2004.) which is computationally efficient and gives useful results comparable to the eigenvector-based methods. Some embodiments of the image segmentation subsystem 320 utilize segmentation methods similar to those presented by Felzenswalb for the bottom-up segmentation. However, the image segmentation subsystem 320 can use any of these segmentation methods or other segmentation methods known to skilled technologists. Details of the functions performed by some embodiments of the image segmentation subsystem 320 are discussed below.

The image segmentation subsystem 320 can be performed at multiple scales, where the size of the segments varies. For example, the scale levels can be selected to include segments smaller than the expected size of objects being classified, as well as segments larger than the expected size of the objects being classified. In this way, the analysis performed by the object segmentation and classification subsystem 300, as a whole, can be a balance of efficiency and accuracy.

The perceptual analysis subsystem 325 calculates feature vectors comprising one or more measures of visual perception for the segments that were identified by the image segmentation subsystem 320. The term "feature vector" is intended to include all kinds of measures or values that can be used to distinguish one or more properties of pixels. The values of the feature vectors can include one or more of intensity, color and texture. In some embodiments, the feature vector values comprise histograms of intensity, color, and/or texture. Color feature vectors can include one or more histograms for hue such as, for example, red, green, or blue.

Color feature vectors can also include histograms representing the saturation or degree of purity of the colors, where saturation is a measure of texture. In some embodiments, Gabor filters are used to generate feature vector values representative of texture. Gabor filters at various orientations may be in order to identify textures in different directions on the image. In addition, Gabor filters of different scales can be used, where the scale determines the number of pixels, and therefore the textural precision, that the Gabor filters can target. Other feature vector values that may be used by the perceptual analysis subsystem 325 include Haar filter energy, edge indicators, frequency domain transforms, wavelet based measures, gradients of pixel values at various scales, and others known to skilled technologists.

In addition to calculating the feature vectors for the segments, the perceptual analysis subsystem 325 also computes similarities between pairs of feature vectors, e.g., feature vectors corresponding to pairs of neighboring segments. As used herein, a "similarity" may be value, or set of vales, measuring how similar two segments are. In some embodiments, the value is based on the already-calculated feature vector. In other embodiments, the similarity may be calculated directly. Although "similar" is a term of art in geometry, roughly indicating that two objects have the same shape but different size, as used herein, "similar" has the normal English meaning including sharing, to some degree, some property or characteristic trait, not necessarily shape. In some embodiments, these similarities are utilized by the statistical analysis subsystem 335 as edges in a factor graph, the factor graph being used to fuse the various outputs of the image segmentation subsystem 320 and the object classification subsystem 330. The similarities can be in the form of a Euclidean distance between feature vectors of two segments, or any other distance metic such as, for example, the 1-norm distance, the 2-norm distance, and the infinity norm distance. Other measures of similarity known to those skilled in the art may also be used, Details of the functions performed by the perceptual analysis subsystem are discussed below.

The object classification subsystem 330 performs analysis of the segments identified by the image segmentation subsystem in order to generate a first measure of probability that the segments are members of the one or more object classes being identified. The object classification subsystem 330 can utilize one or more learned boosting classifier models, the one or more boosting classifier models being developed to identify whether portions of image data are likely to be members of the one or more object classes. In some embodiments, different learned boosting classifier models are generated (e.g., using a supervised learning method) separately for each of the scale levels into which the image segmentation subsystem 320 segmented the pixel data.

The boosting classifier model can be generated, e.g., using a supervised learning method, by analyzing pre-segmented images that contain segments that have been designated as members of the object class and other segments that are not members of the object class. In some embodiments, it is desirable to segment highly non-rigid objects like hands. In these embodiments, the pre-segmented images should contain many different object configurations, sizes and colors. This will enable the learned classifier model to make use of the object class-specific knowledge contained in the pre-segmented images to arrive at a segmentation algorithm.

The boosting classifier can use intensity, color, and texture features and hence can deal with pose variations typical of non-rigid transformations. In some embodiments, the boosting classifier is trained based on the feature vectors that are generated for the pre-segmented image segments by the perceptual analysis subsystem 325. In this way, the learned boosting classifier models will take the feature vectors as input during the actual (as opposed to the supervised training) object segmentation and classification process. As discussed above, the feature vectors may include one or more measures of color, intensity and texture and perform adequately to distinguish several different object types in the same image.

Since objects such as hands, faces, animals, and vehicles can take several different orientations, and in some cases be very non-rigid and/or reconfigurable (e.g., hands with different finger positions, or cars with open doors or a lowered convertible roof), the pre-segmented images can contain as many orientations and/or configurations as possible.

In addition to containing the learned boosting classifier models and determining the first measure of probability that the segments are members of the object class, the object classification subsystem 330 also interfaces with one or more of the perceptual analysis subsystem 325, the statistical analysis subsystem 335 and, in some embodiments, the edge information subsystem 340 in order to fuse together statistically the similarity measures, the first probability measures and measures indicative of edges in making the final classification.

In some embodiments, the object classification subsystem 330 determines multiple candidate segment label maps with each map labeling segments differently (e.g., different object and non-object segment labels). The different segment label maps are then analyzed by the object classification subsystem 330, by interfacing with the statistical analysis subsystem 335, to determine the final classification based on one or more second measures of probability and/or energy functions designed to fuse two or more of the similarity measures, the first probability measures, and the edge measures. Details of the statistical fusing methods are discussed below.

The statistical analysis subsystem 335 performs the functions related to the various statistical means by which the measures generated by the other subsystems are fused together. The statistical analysis subsystem 335 generate factor graphs including the segments generated by the image segmentation subsystem 320 as nodes.

In some embodiments, one or more of the elements of the object segmentation and classification system 300 of FIG. 3 may be rearranged and/or combined. The elements may be implemented by hardware, software, firmware, middleware, microcode or any combination thereof. Details of the actions performed by the elements of the object segmentation and classification system 300 will be discussed in reference to the methods illustrated in FIGS. 4a and 4b below.

Figure 4A:
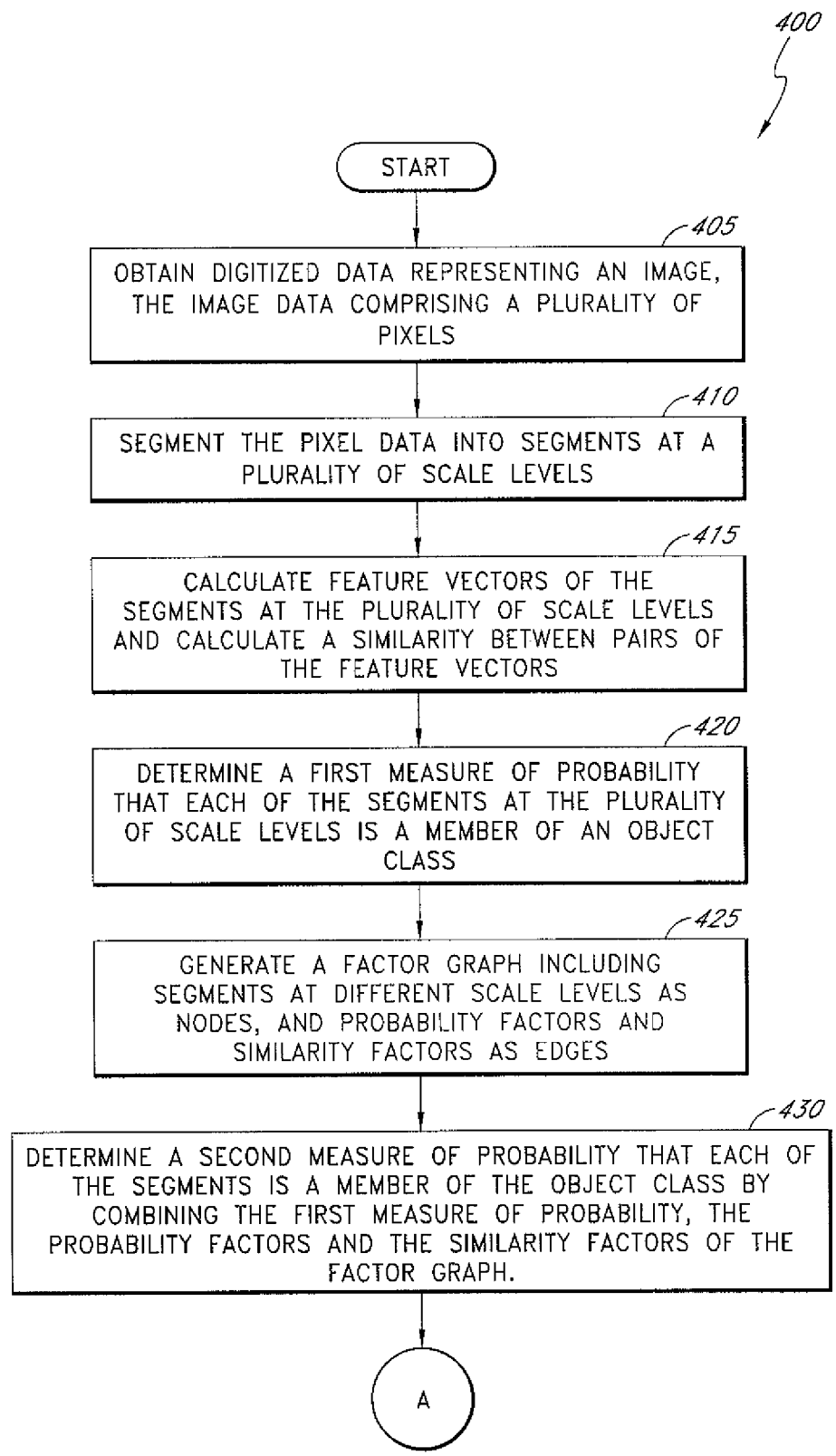
FIGS. 4a and 4b are a flowchart illustrating a method of detecting objects in an image.
Figures 4, 4A, 4B:
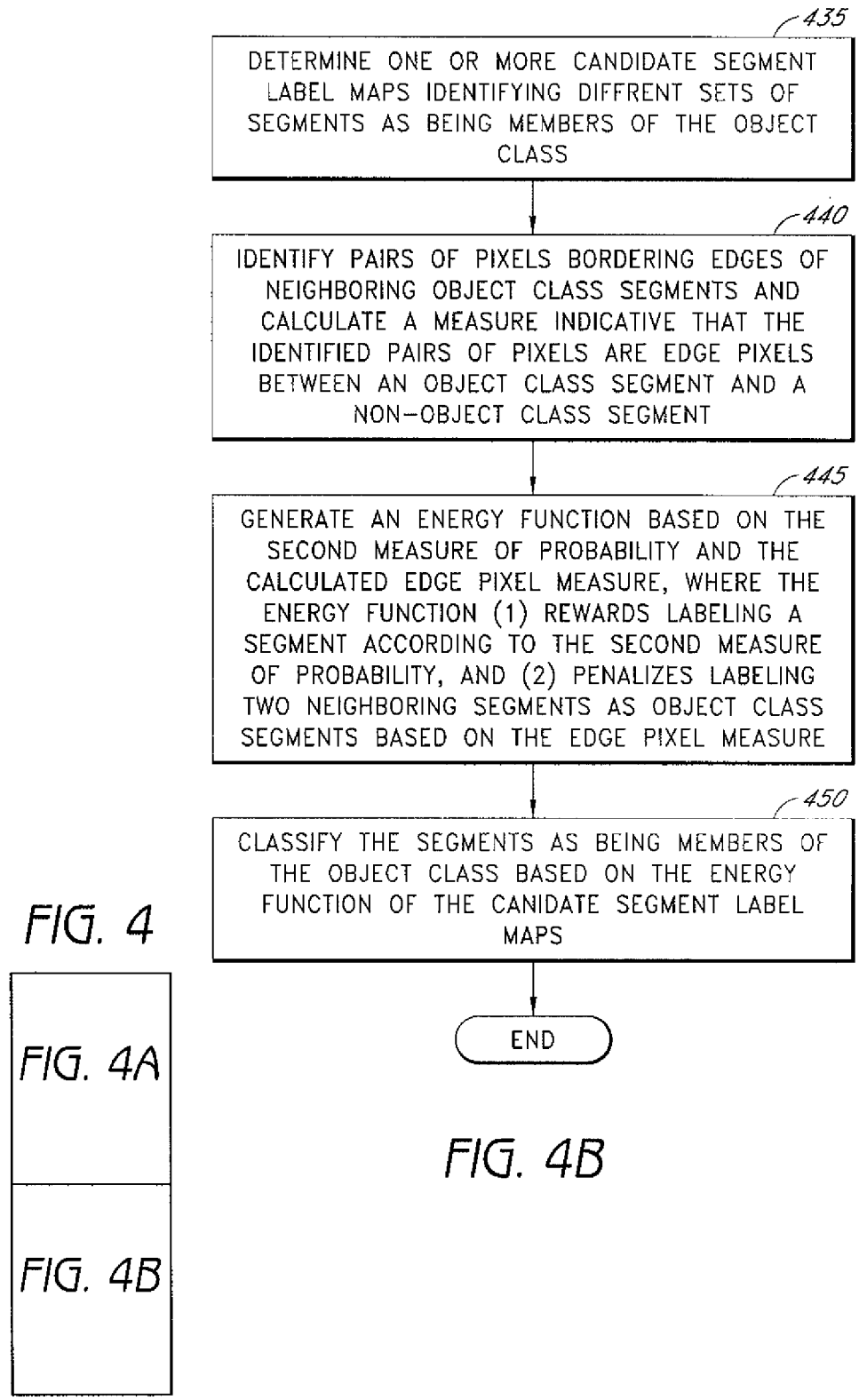

FIGS. 4a and 4b are a flowchart illustrating a method of detecting objects in an image. The procedure 400 begins by obtaining digitized data representing an image, the image data comprising a plurality of pixels 405. The image data may represent one of a plurality of images in a sequence to form a video. The image data may be in a variety of formats, including but not limited to BMP (bitmap format), GIF (Graphics Interchange Format), PNG (Portable Network Graphics), or JPEG (Joint Photographic Experts Group). The image data may be in other forms utilizing one or more of the features represented by the above-mentioned formats such as methods of compression. The image data may also be obtained in an uncompressed format, or at least, converted to an uncompressed format.

The image data is segmented into a number of segments at plurality of scale levels 410. For example, the image may be segmented into 3 segments at a "course" level, 10 segments at a "medium" level, and 24 segments at a "fine" level. The number of levels may be three, five, or any number of levels. One level may be used in some cases. In one embodiment, the segments at a given scale level are non-overlapping. However, the segments at different scale levels may overlap, e.g. by specifying the same pixels as belonging to two segments at different scale levels. The segmentation may be complete, that is, at a single scale level, each pixel may be assigned to one or more segments. In other embodiments, the segmentation may be incomplete and some pixels of the image may not be associated with a segment at that scale level. A number of segmentation methods are described in detail later in this disclosure.

In the next stage of the process, feature vectors of the segments at the plurality of scale levels are calculated, as are similarities between pairs of the feature vectors 415. As mentioned above, a feature vector includes all kinds of measures or values that can be used to distinguish one or more properties of pixels. The values of the feature vectors can include one or more of intensity, color, and texture. In some embodiments, the feature vector values comprise histograms of intensity, color, and/or texture. Color feature vectors can include one or more histograms for hue such as, for example, red, green, or blue. Color feature vectors can also include histograms representing the saturation or degree of purity of the colors, where saturation is a measure of texture. In some embodiments, Gabor filters are used to generate feature vector values representative of texture. Gabor filters at various orientations may be in order to identify textures in different directions on the image. In addition, Gabor filters of different scales can be used, where the scale determines the number of pixels, and therefore the textural precision, that the Gabor filters can target. Other feature vector values that may be used in this stage of the process include Haar filter energy, edge indicators, frequency domain transforms, wavelet-based measures, gradients of pixel values at various scales, and others known to skilled technologists. Similarities between pairs of feature vectors, e.g., feature vectors corresponding to pairs of neighboring segments, are also calculated. The similarities can be in the form of a Euclidean distance between feature vectors of two segments, or any other distance metric such as, for example, the 1-norm distance, the 2-norm distance, and the infinity norm distance. Similarity may also be measured as a correlation between the two feature vectors. Other measures of similarity known to those skilled in the art may also be used. Similarities between two segments can also be calculated directly, bypassing the need for feature vectors. Although "correlation" is a term of art in mathematics, indicating, in one definition, the conjugate of a vector multiplied by the vector itself, as used herein "correlation" may also have the normal English meaning including a measure of the relationship between two objects, such as segments, vectors, or other variables.

The next stage of the process involves determining a first measure of probability that each of the segments at the plurality of scale levels is a member of an object class 420. In other embodiments, a first measure of probability is only determined for a subset of the segments. For example, the first measure of probability may only be determined for those segments away from the edges of the image, or only for those segments having a characteristic identified from the feature vectors. In general, a subset may include only one element of the set, at least two elements of the set, at least three elements of the set, a significant portion (e.g. at least 10%, 20%, 30%) of the elements of the set, a majority of the elements of the set, nearly all (e.g., at least 80%, 90%, 95%) of the elements of the set, of all of the elements of the set. Although "probability" is a term of art in mathematics and statistics, roughly indicating the number of times an event is expected to occur in a large enough sample, as used herein "probability" has the normal English meaning including the likelihood or chance that something is the case. Thus, the calculated probability may indeed correspond to the mathematical meaning, and obey the mathematical laws of probability such as Bayes' Rule, the law of total probability, and the central limit theorem. The probabilities may also be weights or labels ("likely"/"not likely") to ease computational costs at the possible expense of accuracy.

In the next stage of the process, a factor graph is generated including segments at different scale levels as nodes and probability factors and similarity factors as edges 425. Other methods of combining the information garnered about the object classification of the segments may be used. As a factor graph is a mathematical construct, an actual graph need not be constructed to achieve the same deterministic results. Thus, although it is described as generating a factor graph, it is understood that as this phrase is used herein to describe a method of combining information. The probability factors and similarity factors include the likelihood that a parent node should be classified as an object given the likelihood a child node has been so classified, the likelihood of a node should be classified as an object given the feature vector, the feature vector of the node itself, or the likelihood a node should be classified as an object given all other information.

With this information, a second measure of probability that each segment is a member of the object class is determined by combining the first measure of probability, the probability factors, and the similarity factors of the factor graph 430. As with the first measure of probability, in some embodiments, the determination of the second measure is only performed for a subset of the segments. As mentioned above, other methods of combining the information may be employed. It is also reiterated that although mathematical probabilities may be used in some embodiments, the term "probability" includes the likelihood or chance that something is the case, e.g., the likelihood that a segment belongs to an object class. As such, in some embodiments, the combining may be performed by adding weights or comparing labels instead of rigorous mathematical formulation.

At this point, one or more candidate segment label maps may be determined, each map indentifying different sets of segments as being members of the object class 435. In one embodiment, each candidate segment label map is a vector of 1 s and 0 s, each element of the vector corresponding to a segment, each 1 indicating that the segment is a member of the object class, and each 0 indicating that the segment is not a member of the object class. In other embodiments, the candidate segment label maps may associate a probability that each segment belongs to an object class. Some embodiments of the invention may superimpose a candidate segment label map over the image to better visualize the proposed classification. The number of candidate segment label maps may also vary from embodiment to embodiment. In one embodiment, for example, only one candidate segment label map may be created. This map may be the most likely mapping or a random mapping. In other embodiments, many candidate segment label maps may be determined. A collection of candidate segment label maps including all possible mappings may be generated, or a subset including only the most likely mappings.

The one or more candidate segment label maps may further be associated with a probability that the candidate segment label map is correct. As above, this may be accomplished through a number of methods, including summing weights, comparing nominative labels, or using the laws of mathematical probability. In some embodiments, one of the candidate segment label maps may be chosen as the final label map and this may be used in other applications, such as user interface control. This choosing may be based on any of a number of factors. For example, the label map that is most likely correct may be chosen as the final label map. In other embodiments, the most likely label map may not be chosen to avoid errors in the application of the label map. For example, if the most likely label map indicates that no segments should be classified as objects, this label map may be ignored for a less likely mapping that includes at least one segment classified as an object. The chosen candidate segment label map may be used to finally classify each segment as being either an object or not an object. In other embodiments, the construction of one or more candidate segment label maps may be skipped and the segments themselves classified without the use of a mapping. For example, the segment most likely belonging to the object class may be output without classifying the other segments using a map.

In other embodiments, the candidate segment label maps are further refined using edge data. For example, the next stage of the process 400 involves indentifying pairs of pixels bordering edges of neighboring segments and calculating a measure indicative that each identified pair of pixels are edge pixels between an object class segment and a non-object class segment 440. Simple edge detection is well-known in image processing and a number of methods of calculating such a measure are discussed below.

Using this information may include generating an energy function based on the second measure of probability and the calculated edge pixel measure 445. In one embodiment, the energy function (1) rewards labeling a segment according to the second measure of probability and (2) penalizes labeling two neighboring segments as object class segments based on the edge pixel measure. Other methods may be used to incorporate edge information into the classification process. In one embodiment, for example, the energy function utilizes a smoothness cost, which is a function of two neighboring segments, and adds this to a data cost, which is a function of a single segment or more particularly, the likelihood that a single segment belongs to an object class.

By combining the bottom-up, top-down, and edge information, the segments may now be classified as being members of the object class 450. In other embodiments, the edge information is not used, as mentioned above with regards to candidate segment label maps, and classification may be performed at an earlier stage of the process. One embodiment classifies the segments by minimizing the energy function calculated in the previous stage. Minimization methods, and optimization methods in general, are well-known in the art. Embodiments of the invention may use gradient descent, a downhill simplex method, Newton's method, simulated annealing, the genetic algorithm, or a graph-cut method.

At the conclusion of the process, the result is a classification for at least one segment as either belonging to an object class or not belonging to an object class. If the desired output is the location of an object, further processing may be performed to ascertain this information. Further, if the analyzed image is part of series of images, such as is the case with video data, the location of an object may be tracked and paths or trajectories may be calculated and output.

For example, if the object class includes human hands, the paths or trajectories formed by video analysis may be used as part of a human-machine interface. If the object class includes vehicles (cars, trucks, SUVs, motorcycles, etc.), the process may be employed to automate or facilitate traffic analysis. An automated craps table may be created by selected and training dice as the object class, tracking the thrown dice with a camera, and analyzing the resulting number when the dice have settled to rest. Facial recognition technology could be improved by classifying a segment as a face.

Image Segmentation

Just like the segmentation aids other vision problems, segmentation benefits from the other vision information as well. Some segmentation algorithms use the fact that object recognition may be used to aid object segmentation. Among these are the algorithms for figure-ground segmentation of objects of a known class. These algorithms often benefit from the integration of bottom-up and top-down cues simultaneously. The bottom-up approach makes use of the fact that intensity, color, and/or texture discontinuities often characterize object boundaries. Therefore, one can segment the image into a number of homogeneous regions and then identify those regions belonging to the object. This may be done without regard to any particular meaning of the components, for instance, by only following the uniformity of intensity and color of the component regions, or by including the shape of the boundaries. This alone may not result in a meaningful segmentation because the object region may contain a range of intensities and colors similar to the background. Thus, the bottom-up algorithms often produce components which mix object with background. On the other hand, top-down algorithms follow a complementary approach and make use of the knowledge of the object that the user is trying to segment out. Top-down algorithms look for the region which will resemble the object in shape and/or appearance. Top-down algorithms face the difficulty of dealing with appearance and shape variations of the objects and pose variations of the images. In "Class-specific, top-down segmentation," by E. Boresntein and S. Ullman, in ECCV(2), pages 109-124, 2002, the authors present a top-down segmentation method which is guided by a stored representation of the shape of the objects within the class. The representation is in the form of a dictionary of object image fragments. Each fragment has associated with it a label fragment which gives the figure-ground segmentation. Given an image containing an object from the same class, the method builds a cover of the object by finding a number of best matching fragments and the corresponding matching locations. This is done by correlating the fragments with the image. The segmentation is obtained by a weighted average of the corresponding fragment labels. The weight corresponds to the degree of match. The main difficulty with this approach is that the dictionary has to account for all possible variations of appearance and pose of the class objects. In the case of non-rigid objects, the dictionary can become impractically large.

Because of the complementary nature of the two cues, several authors have proposed combining both. Better results have been shown by algorithms which integrate both the cues. In "Region segmentation via deformable model-guided split and merge," by L. Lin and S. Scarloff, in ICCV(1), 2001, deformable templates are combined with bottom-up segmentation. The image is first over-segmented, and then various groupings and splittings are considered to best match a shape represented by a deformable template. This method faces difficult minimization in a high-dimensional parameter space. In "Comibining top-down and bottom-up segmentation," by E. Borsenstein, E. Sharon, and S. Ullman, in CVPR POCV, Washington, 2004, they apply image fragments for top-down segmentation and combine it with bottom-up criteria using a class of message-passing algorithms. In the following two sections, bottom-up and top-down segmentation methods are disclosed.

Bottom-Up Segmentation

Figure 5:
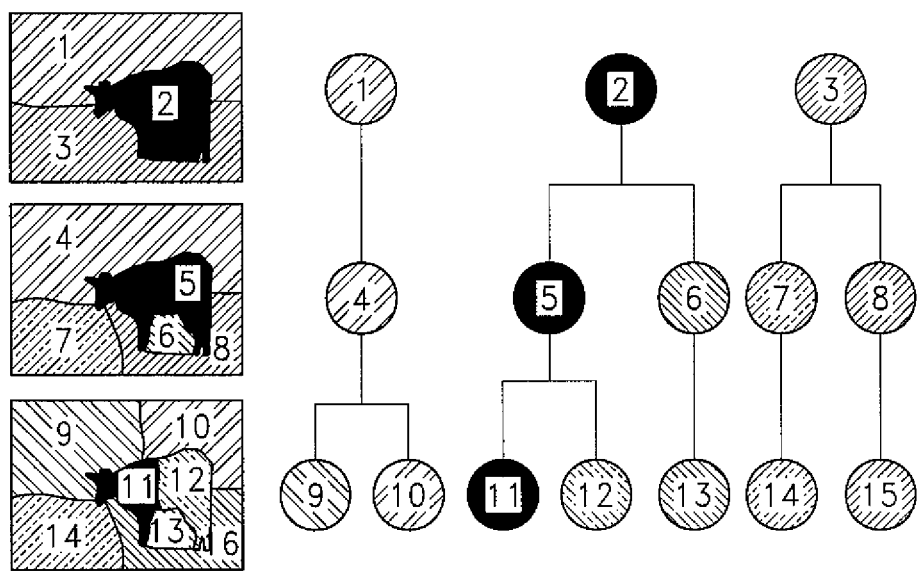
FIG. 5 is an illustration showing the use of multi-scale segmentation for the fusion of segmentation information using a tree forms from the components at different scales.

Some embodiments of bottom-up segmentation employ a graph in which pixels are the nodes and the edges which connect neighboring pixels have weights based on the intensity similarity between them. The method measures the evidence for a boundary between two regions by comparing two quantities: one based on the intensity differences across the boundary and the other based on the intensity differences between neighboring pixels within each region. Although this method makes greedy decisions it produces segmentations that satisfy some global properties. The algorithm runs in time nearly linear in the number of image pixels and is also fast in practice. Since the evidence of a boundary may be decided based on the intensity difference between two components relative to the intensity differences within each of the components, the method is able to detect texture boundaries and boundaries between low-variability regions as well as high-variability regions. Color images may be segmented by repeating the same procedure on each of the color channels and then intersecting the three sets of components. For example, two pixels may be considered in the same component when they appear in the same component in all three of the color plane segmentations. Other method of segmenting color images may be used, including analysis of hue, saturation, and/or lightness or value, The aim of bottom-up segmentation is to break down the image along intensity and color discontinuities. Segmentation information is collected and used at a number of scales. For example, three scales are used for FIG. 5. FIG. 5 is an illustration showing the use of multi-scale segmentation for the fusion of segmentation information using a tree forms from the components at different scales. At the lowest scale, some components may be too fine to be recognized reliably and, similarly, at the highest scale, some components might be too big so as to confuse the classifiers. When segments are small, a top-down algorithm may more easily find a group of segments which together constitute the shape of the object. That means top-down information dominates the overall segmentation. On the other hand, when bottom-up segments are too big, it can become difficult to find any subset which can form the shape of the object. Often the segments can overlap with both foreground and background. A good trade-off is obtained by considering segmentation at a number of different scales. In a multi-scale decomposition as depicted in FIG. 5, the components receive high recognition scores at the scale in which they are most recognizable and the components at the other scales can inherit the labels from their parents. This is because relevant components which may not appear in one scale can appear in another. This benefits the top-down segmentation later by way of giving the boosting classifier information at multiple scales. In the example of FIG. 5, for example, segment 5 may be recognized by an object-classifying algorithm as being a cow. Segment 2 lacks this shape, as does segment 11 and 12. Thus, if segmentation were only performed at one scale, the object classifier may miss that there is a cow in this image. The information may be propagated through the tree to indicate that segment 2 includes a cow, and that segment 11 and 12 are parts of a cow. The hierarchy of segmentations may be produced by using the same segmentation algorithm with a number of different set of parameters. For example, for hand-image training, one might use three different sets of the parameters {σa, k, and m}, where a represents a Gaussian filter parameter, k defines the scale which depends on the granulation of the image, and m defines a number of iterations to iteratively group the pixels. Three such sets of parameters, may be, for example, {1, 10, 50}, {1, 10, 100} and {1, 10, 300} for respectively the first, second and third scales. In another embodiment, different segmentation algorithms are used at the different scales.

The segmentations at different scales form a segmentation hierarchy which is converted to a tree-structured conditional random field (CRF) in which the segments form nodes and the edges express the geometrical relation between the components of different scales. It is used as a strong prior for enforcing bottom-up consistency in the final segmentation. This may be done, in some embodiments, by a belief propagation (BP) based inference on this tree after entering the node evidences (e.g., probabilities) given by the top-down classifier.

Top-down Segmentation

Some embodiments of the invention are capable of segmenting highly non-rigid objects, such as hands, using a supervised-leaning method based on boosting. This may enable the use of the object class-specific knowledge to perform segmentation. In one embodiment, the boosting classifier uses intensity, color, and texture features and hence can deal with pose variations and non-rigid transformations. It has been shown in "Object categorization by learned visual dictionary," by J. Winn, A. Criminisi, and T. Minka, IEEE Conference on Computer Vision and Pattern Recognition, 2005, that a simple color-and-texture-based classifier can do remarkably well at detecting nine different kinds of objects ranging from cows to bicycles. Since some objects may be highly non-rigid, a dictionary-of-fragments-based method may require too large a dictionary to be practicable. This may change as storage space increases and processor speeds improve further. In one embodiment using three segmentation scales, three classifiers work on the three scales separately and are trained separately.

In some embodiments, the boosting classifier is designed for each scale separately. In other embodiments, however, the boosting classifier for each scale may constructively share appropriately-scaled information. In other embodiments, multiple boosting classifiers may be designed for each scale using different training sets such that their data can be integrated or not integrated depending on the image being analyzed. At each scale, feature vectors are computed for each segment. In one embodiment, the feature vector is composed of histograms of intensity, color, and texture. To measure texture, Gabor filters may be used, for example at 6 orientations and 4 scales. A histogram of the energy of the output of these filters over each segment may be computed. For example, one may use a 100-bin 2D histogram for hue and saturation and a 10-bin histogram for intensity. For Gabor filter energies, an 11-bin histogram may be used. In the embodiment using the numbers described, this gives 100+10+6×4×11=374 features, The number of features in other embodiments may be more or less, depending on the application.

Boosting may facilitate classification of the segments given by the bottom-up segmentation algorithm into object and background. Boosting has proven to be a successful classification algorithm in these applications as demonstrated in "Additive logistic regression: A statistical view of boosting," by J. Friedman, T. Hastie, and R, Tibshirani, Annals of Statistical, 2000, and in "Sharing visual features for multiclass and multiview object detection," by A. Torralba, K. P. Murphy, and W. T. Freeman, IEEE Transactions on Pattern Analysis and Machine Intelligence, vol. 29, No. 5, May 2007. Boosting fits an additive classifier of the form $$H(v) = \sum_{m=1}^{M} h_m(v),$$

where v is the component feature vector, M is number of boosting rounds, and $$H(v) = \log\left(\frac{P(x=1 \mid v)}{P(x=-1 \mid v)}\right)$$

is the log-odds of component label x being +1 (object) as against −1 (background). This gives $$P(x=1 \mid v) = \frac{1}{1 + e^{-H(v)}}.$$

It is to be noted that each of the M, $h_m(v)$ terms acts on a single feature of the feature vector and hence is called a weak classifier and the joint classifier, H(v), is called a strong classifier. In some embodiments, M is the same as the number of features. Thus, boosting optimizes the following cost function one term of the additive model at a time:

$$J = E[e^{-xH(\mu)}]$$

where E denotes the expectation. The exponential cost function $e^{-xH(v)}$ can be thought of as a differentiable upper bound on the misclassification error $1_{|xH(\mu)<0|}$ which takes the value 1 when xH(v)<0 and 0 otherwise. The algorithm chosen to minimize J is, in one embodiment, based on gentleboost as discussed in "Additive logistic regression" (see above) because it is numerically robust and has been shown experimentally to outperform other boosting variants for tasks like face detection. Other boosting methods may be used in embodiments of the invention. Additionally, other methods of object classification not based on boosting may be employed in top-down portions of the algorithm. In gentle boost, the optimization of J is done using adaptive Newton steps, which corresponds to minimizing a weighted squared error at each step. For example, suppose there is a current estimate H(v) and one seeks an improved estimate H(v)+$h_m$(v) by minimizing J(H+$h_m$) with respect to $h_m$. Expanding J(H+$h_m$) to second order about $h_m$=0, $$J(H+h_m) = E[e^{-x(H(v)+h_m(v))}] \approx E[e^{-xH(v)}(1-xh_m+h_m(v)^2/2].$$

Note that $x^2$=1, regardless of the positive or negative value of x. Minimizing point-wise with respect to $h_m$(v), we find, $$h_m = \arg\min_h E_w(1 - xh(v) + h(v)^2/2)$$
$$h_m = \arg\min_h E_w(x - h(v))^2,$$

where $E_w$ refers to the weighted expectation with weights $e^{-xH(v)}$. By replacing the expectation with an average over the training data, and defining weights $w_i=e^{-x_iH(v_i)}$ for training example i, this reduces to minimizing the weighted squared error:

$$J_{se} = \sum_{i=1}^{N} w_i(x_i - h_m(v_i))^2,$$

where N is the number of samples.

The form of the weak classifiers $h_m$ may be, for example, the commonly used one, $a\delta(v^f>\theta)+b\delta(v^f\leq\theta)$, where f denotes the $f^{th}$ component of the feature vector v, θ is a threshold, δ is the indicator function, and a and b are regression parameters. In other embodiments, different forms of the weak classifiers are used. Minimizing $J_{se}$ with respect to $h_m$ is equivalent to minimizing with respect to its parameters. A search may be done over all possible feature components f to act on and for each f over all possible thresholds θ. Given optimal f and θ, a and b may be estimated by weighted least squares or other methods. That gives, $$a = \frac{\sum_i w_i x_i \delta(v_i^f > \theta)}{\sum_i w_i \delta(v_i^f > \theta)} \text{ and } b = \frac{\sum_i w_i x_i \delta(v_i^f \leq \theta)}{\sum_i w_i \delta(v_i^f \leq \theta)}.$$

This weak classifier may be added to the current estimate of joint classifier H(v). For the next round of update, the weights on each training sample become $w_i$hu x,$h^{\pi(v_i)}$. It can be seen that weight increases for samples which are currently misclassified and decreases for samples which are correctly classified. The increasing weight for misclassified samples is a oft-seen feature of boosting algorithms.

In some embodiments of the method, segments are considered as foreground or background only when they have at least 75% of pixels labeled as foreground or background respectively. In other embodiments, only a majority of the pixels needs to be labeled as foreground or background to have the segments considered as foreground or background respectively. In still other embodiments, a third label may be applied to ambiguous segments having a significant proportion of both foreground and background pixels.

Fusion of Bottom-Up and Top-Down Segmentation

The segments produced by the multi-scale bottom-up segmentation are used, conceptually, to build a tree where a node (or nodes) corresponding to a segment at one level connects to a node at a higher level corresponding to the segment with the most common pixels. The result, as can be seen in FIG. 5, is a collection of trees, since the nodes at the highest level have no parents. One may also consider the highest nodes to all connect to a single node representing a segment which encompasses the entire image. The edges (or lines connecting the child and parent nodes) are assigned a weight to reflect the degree of the coupling between the parent and child nodes. It is possible that components at a higher level are formed by the merger of background and foreground components at a lower level. In that case, the label of the parent should not affect the label of the children. Therefore the edges are weighted by the similarity between the features of the two components. The similarity may be calculated from a Euclidean distance between the two feature vectors. Other methods, as discussed above, may also be used. A conditional random field (CRF) structure is obtained by assigning conditional probabilities based on the edge weights. If the weight of the edge connecting node j to its child node i is $\lambda_{ij}=e^{-||f_i-f_j||^2}$, the conditional probability distribution of node i given node j is $$P_{ij} = \begin{bmatrix} e^{a\lambda_{ij}} & e^{-a\lambda_{ij}} \\ e^{-a\lambda_{ij}} & e^{a\lambda_{ij}} \end{bmatrix}.$$

where a is a constant scale factor, e.g. 1. In some embodiments, particular those using mathematical probabilities, the columns are normalized so that they sum to one. Fusion of bottom-up segmentation with top-down segmentation is done by using the bottom-up segmentation to give an a prior probability distribution for the final segmentation, X, based on the CRF structure. The top-down segmentation likelihood given by the boosting classifier is considered as the observation likelihood. Conditioned on the parent nodes, the segment nodes in a level are independent of each other. Let X denote the segment labels for all nodes in all levels. The prior probability of X from the bottom-up segmentation is given by, $$P(X|B) = \prod_{l=1}^{L-1} \prod_{i=1}^{N_l} P(X_i^l | \pi(X_i^l)),$$

where $X_i^l$ denotes the ith node at the lth level, $N_l$ is the number of segments at the lth level and L is the number of levels. Stated another way, the probability that a certain labeling is correct from the bottom-up segmentation alone is based on the product of the probabilities that a labeling is correct for each node. Note that the nodes at the highest level are not included as they lack parent nodes. One aspect of the invention provides fusion of the bottom-up and top-down information. Thus, it provides the probability a segment labeling is correct given both B, the bottom-up information, and T, the top-down information. One may denote this probability as P(X|B,T). This step may be calculated using mathematical probabilities and Bayes' rule as shown below, or by using other methods.

$$P(X \mid B, T) = \frac{P(X \mid B) P(T \mid X, B)}{P(T \mid B)}$$

Figure 6:
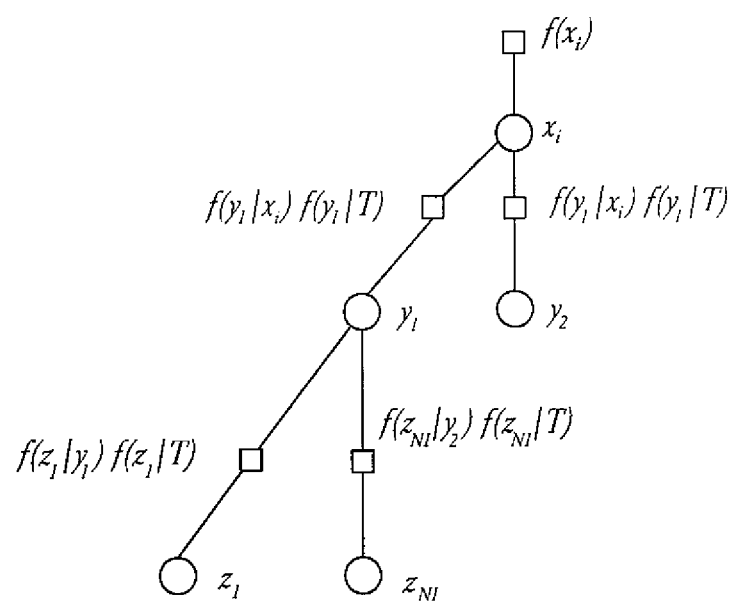
FIG. 6 is an exemplary factor graph corresponding to a conditional random field used for fusing the bottom-up and top-down segmentation information.

Final segmentation is found by maximizing P(X|B,T) with respect to X which is equivalent to maximizing P(X|B)P(T|X, B). The top-down term P(T|X,B) may be obtained from the boosting classifier. Since the top-down classifier acts on the segments independently of each other, the resulting probabilities are assumed to be independent.

$$P(T \mid X, B) = \prod_{l=1}^{L} \prod_{i=1}^{N_l} \frac{1}{1 + e^{-H(v_i^l)}},$$

where $H(v_i^l)$ is the output of the boosting classifier for the ith node at the lth level. The maximization of P(X|B,T) may be done by a factor-graph-based inference algorithm such as the max-sum algorithm or sum-product algorithm. The tree may also be conceptualized as a factor graph of the form shown in FIG. 6. FIG. 6 is an exemplary factor graph corresponding to a conditional random field used for fusing the bottom-up and top-down segmentation information. The nodes labeled with the letters x, y, and z correspond respectively to the third, second, and first level segments and $N_j$ denotes the number of child nodes of node $y_j$. A factor graph can be used by introducing factor nodes (represented in the figure as square nodes). Each factor node represents the function product of the bottom-up prior probability term and the top-down observation likelihood term. The max-sum algorithm exploits the conditional independence structure of the CRF tree which gives rise to the product form of the joint distribution. This algorithm finds the posterior probability distribution of the label at each node by maximizing over the label assignment at all the other nodes. Because of the tree structure, the algorithm complexity is linear in the number of segments and the inference is exact. Alternatively, one may use a variation that finds the marginal posterior probability of each node label x, from the joint probability P(X|B,T) by summing over other nodes. For this variation, one may use the sum-product form of the algorithm.

Integrating Edge Information

Edge detection based on low-level cues such as gradient alone is not the most robust or accurate algorithm. However, such information may be employed and useful in some embodiments of the invention. "Supervised learning of edges and object boundaries," by P. Dollar, Z. Tu, and S. Belongie, IEEE Conference on Computer Vision and Pattern Recognition, June 2006, introduces a novel supervised learning algorithm for edge and boundary detection which is referred to as Boosted Edge Learning (BEL). The decision of an edge is made independently at each location in the image. Multiple features from a large window around the point provides significant context to detect the boundary. In the learning stage, the algorithm selects and combines a large number of features across different scales in order to learn a discriminative model using the probabilistic boosting tree classification algorithm. Ground truth object boundaries needed for the training may be derived from the ground truth figure-ground labels used for training the boosting classifier for top-down segmentation. In other embodiments, different training may be used for the edge detector and the top-down classifier. The figure-ground label map may be converted to the boundary map by taking the gradient magnitude. Features used in the edge learning classifier include gradients at multiple scales and locations, differences between histograms computed over filter responses (difference of Gaussian (DoG) and difference of offset Gaussian (DooG)) at multiple scales and locations, and also Haar wavelets. Features may also be calculated over each color channel. Other methods of handling color images may be employed, including analysis of the hue, saturation, and/or intensity rather than color channels.

Having obtained the posterior probability distribution, to arrive at the final segmentation at the finest scale, one can assign to each component at the finest scale the label with the higher probability. This is known as a maximum a posteriori or MAP decision rule. When label assignment is per segment, there may be instances of mislabeling some pixels in those segments which contain both background and foreground. This may also occur in some segments because of the limitations of the bottom-up segmentation. Some embodiments of the invention provide a solution to this problem by formulating a pixel-wise label assignment problem which maximizes the posterior probability of labeling while honoring the figure-ground boundary. The figure-ground boundary information is obtained at the finest scale from the Boosting-based Edge Learning described in the previous section. BEL is trained to detect the figure-ground boundary of the object under consideration.

Given the probability distribution given the bottom-up and top-down information, P(X|B,T) and the edge probability given the image I, P(e|I), from the Boosting-based Edge Detector, one may define the energy of a binary segmentation map at the finest scale, $X_1$ as:

$$E(X_1; I) = v \sum_{\{p,q\} \in N} V_{p,q}(X_p, X_q) + \sum_{p \in P_1} D_p(X_p),$$

where $V_{p,q}$ is a smoothness cost, $D_p$ is a data cost, N is a neighborhood set of interacting pixels, $P_1$ is the set of pixels at the finest scale and v is the factor which balances smoothness cost and data cost. One may use, for example, a 4-connected grid neighborhood and v=125. There is a joint probability associated with the energy which can be maximized by minimizing the energy with respect to the labels. The data cost may be, for example, $D_p(X_p=1)=P(X_p=0|B,T)$ and $D_p(X_p=0)=P(X_p=1|B,T)$. This will enforce the label that has higher probability. Smoothness of the labels may be enforces while preserving discontinuity at the edges, for instance, by using Potts' model.

$$V_{p,q}(X_p, X_q) = \begin{cases} 0 & \text{if } f_p = f_q \\ w_{p,q} & \text{if } f_p \neq f_q \end{cases}$$

where $w_{p,q}=\exp(-a*\max(P(e_p|I), P(e_q|I)))$, $P(e_p|I)$ and $P(e_q|I)$ are the edge probabilities at pixels p and q, and a is a scale factor, e.g. 10. Final segmentation may be obtained from the label assignment which minimizes this energy function. The minimization may be, for example, carried out by a graph-cuts-based algorithm described in "Fast approximate energy minimization via graph cuts," by Y. Boykov, O. Veksler, and R. Zabih, *IEEE Transactions on Pattern Analysis and Machine Intelligence*, November 2001. The algorithm efficiently finds a local minimum with respect to a type of large moves called alpha-expansion moves and can find a labeling within a factor of two from the global minimum.

Motion Center Analysis

As described above with respect to FIG. 1, embodiments of the invention comprise a motion center analysis subsystem 134. Although the invention is not limited to any particular method of determining motion centers for objects or frames, one embodiment of such method is described in detail below.

Figure 7:
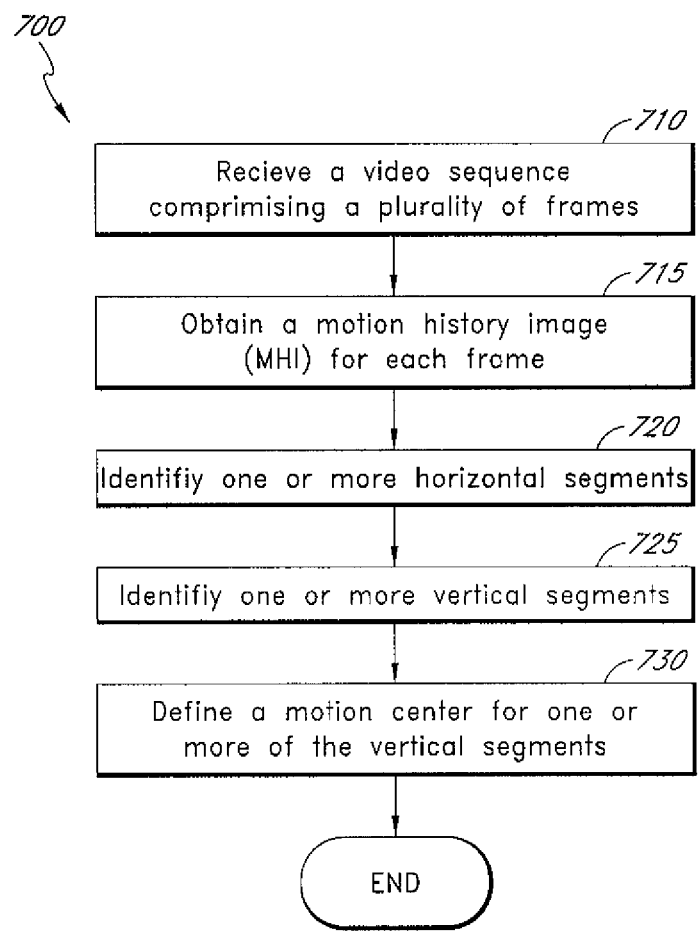
FIG. 7 is a flowchart illustrating one embodiment of a method of defining one or more motion centers associated with objects in a video sequence.

FIG. 7 is a flowchart illustrating one embodiment of a method of defining one or more motion centers associated with objects in a video sequence. The method 700 begins, in block 710, by receiving a video sequence comprising a plurality of frames. The video sequence may be received, for example, via the video capture device 100 or the memory 150 of FIG. 1. In some embodiments of the method, the received video sequence is not what is recorded by the video capture device 100, but a processed version of the video camera data. For example, the video sequence may comprise a subset of the video camera data, such as every other frame or every third frame. In other embodiments, the subset may comprise selected frames as processing power permits. In general, a subset may include only one element of the set, at least two elements of the set, at least three elements of the set, a significant portion (e.g. at least 10%, 20%, 30%) of the elements of the set, a majority of the elements of the set, nearly all (e.g., at least 80%, 90%, 95%) of the elements of the set, or all of the elements of the set. Additionally, the video sequence may comprise the video camera data subjected to image and/or video processing techniques such as filtering, desaturation, and other image processing techniques known to those skilled in the art.

Next, in block 715, a motion history image (MHI) is obtained for each frame. In some embodiments, a MHI is obtained for a subset of the frames. A motion history image is a matrix, similar to image data, which represents motion that has occurred in previous frames of the video sequence. For the first frame of the video sequence, a blank image may be considered the motion history image. As this may be by definition, the blank image may not be calculated or obtained explicitly. Obtaining a MHI may comprise calculating the motion history image using known techniques or new methods. Alternatively, obtaining a MHI may comprise receiving the motion history image from an outside source, such as a processing module of the video camera device 110, or retrieved from the memory 150 along with the video sequence. One method of obtaining a motion history image will be described with respect to FIG. 8; however, other methods may be used.

In block 720, one or more horizontal segments are identified. In general, the segments may be in a first orientation, which is not necessarily horizontal. In one embodiment, the one or more horizontal segments will be identified from the motion history image. For example, the horizontal segments may comprise sequences of pixels of the motion history image that are above a threshold. The horizontal segments may also be indentified through other methods of analyzing the motion history image. Next, in block 725, one or more vertical segments are identified. In general, the segments may be in a second orientation, which is not necessarily vertical. Although one embodiment identifies horizontal segments, then vertical segments, another embodiment may indentify vertical, then horizontal segments. The two orientations may be perpendicular, or, in other embodiments, they may not be. In some embodiments, the orientations may not be aligned with the borders of the frame. The vertical segments may comprise, for example, vectors wherein each element corresponds to a horizontal segment that is greater than a specific length. It is important to realize that the nature of the horizontal segments and the vertical segments may differ. For example, in one embodiment, the horizontal segments comprise elements that correspond to pixels of the motion history image, wherein the vertical segments comprise elements that correspond to horizontal segments. There may be two vertical segments that correspond to the same row of the motion history image, when, for example, two horizontal segments are in the row, and each of the two vertical segments is associated with a different horizontal segment in that row.

Finally, in block 730, a motion center is defined for one or more of the vertical segments. As the vertical segments are associated with one or more horizontal segments, and the horizontal segments are associated with one or more pixels, transitively, each vertical segment is associated with a collection of pixels. The pixel locations can be used to define a motion center, which is itself a pixel location, or a location within an image between pixels. In one embodiment, the motion center is a weighted average of the pixel locations associated with the vertical segment. Other methods of finding a "center" of the pixel locations may be used. The motion center may not necessarily correspond to a pixel location identified by the vertical segment. For example, the center of a crescent-shaped pixel collection may be outside of the boundaries defined by the pixel collection.

The defined motion centers may then be stored, transmitted, displayed, or in any other way, output from the motion center analysis subsystem 134.

Motion History Image

Figure 8:
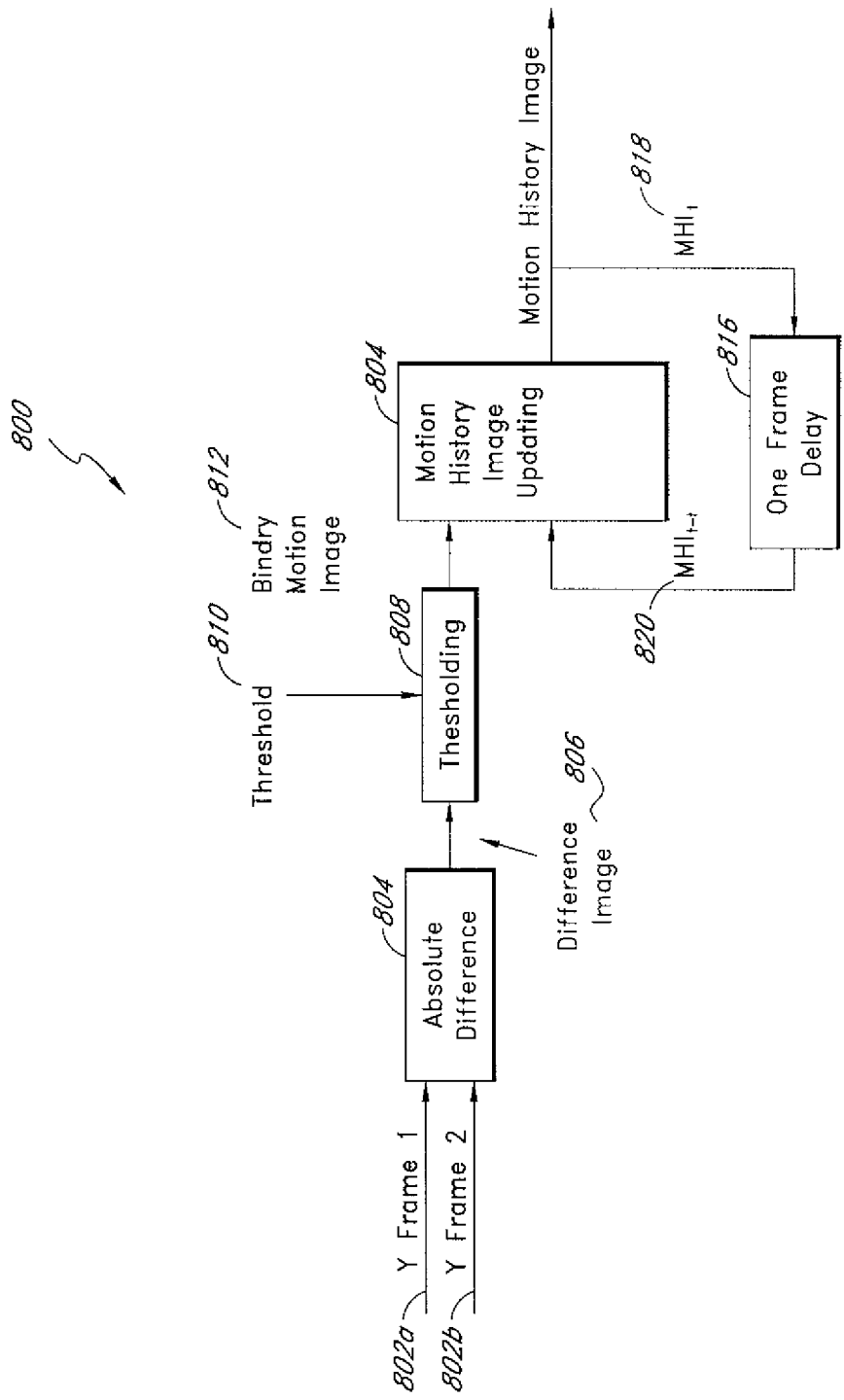
FIG. 8 is a functional block diagram illustrating a system capable of computing a motion history image (MHI).

FIG. 8 is a functional block diagram illustrating a system capable of computing a motion history image (MHI). Two video frames 802a, 802b are input into the system 800. The video frames 802 may be the intensity values associated with a first frame of a video sequence and a second frame of a video sequence. The video frames 802 may be the intensity of a particular color value. The video frames 802, in some embodiments, are consecutive frames in the video sequence. In other embodiments, the video frames are non-consecutive so as to more quickly, and less accurately, calculate a motion history image stream. The two video frames 802 are processed by an absolute difference module 804. The absolute difference module 804 produces an absolute difference image 806, wherein each pixel of the absolute difference image 806 is the absolute value of the difference between the pixel value at the same location of the first frame 802a and the pixel value at the same location of the second frame 802b. The absolute difference image is processed by a thresholding module 808, which also takes a threshold 810 as an input.

Figure 9:
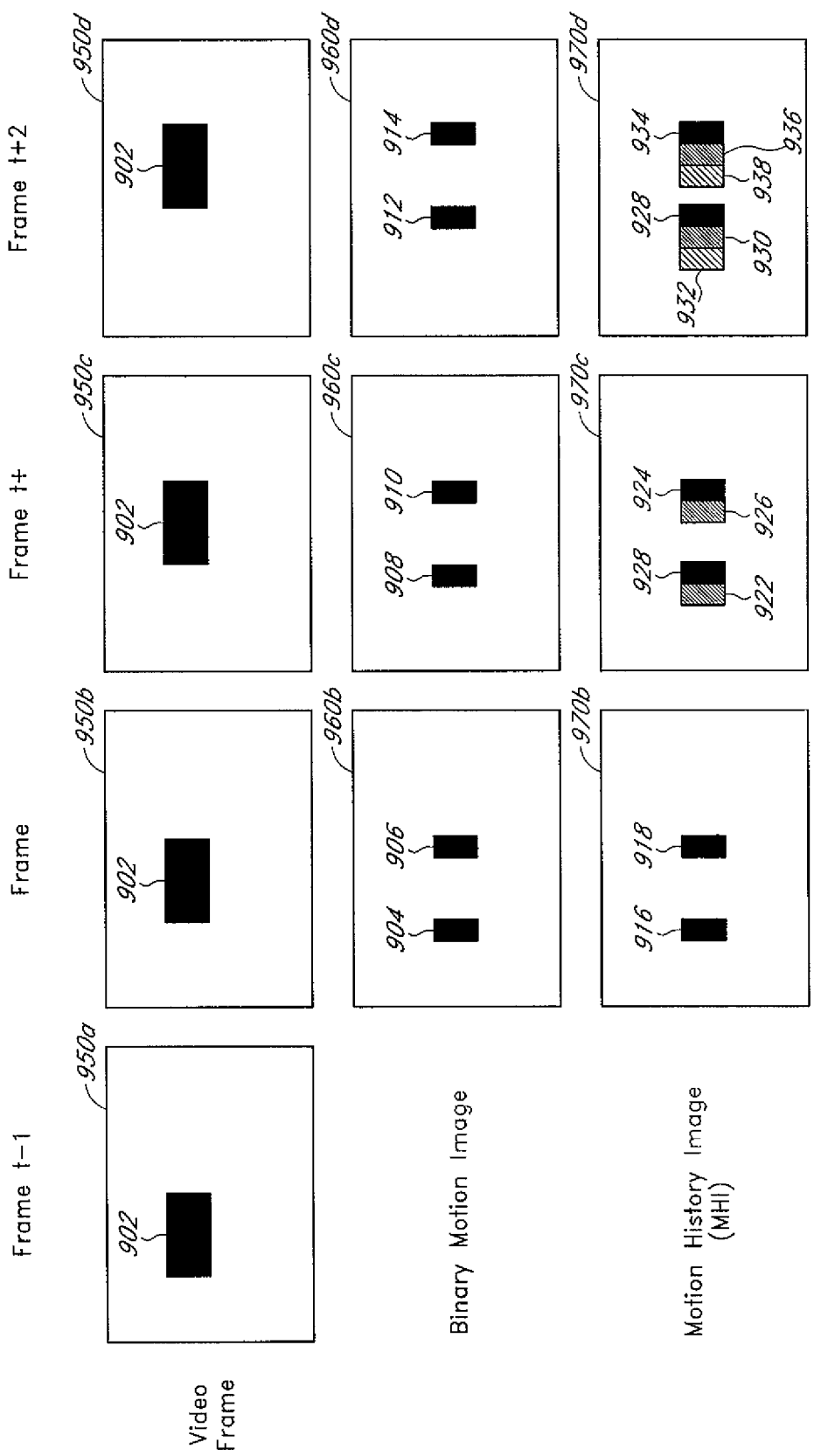
FIG. 9 is a diagram of a collection of frames of a video sequence, the associated binary motion images, and the motion history image of each frame.

In some embodiments, the threshold 810 is fixed. The thresholding module 808 applies the threshold 810 the absolute difference image 806 to produce a binary motion image 812. The binary motion image is set to a first value if the absolute difference image 806 is above the threshold 810 and is set to a second value if the absolute difference image 806 is below the threshold 810. In some embodiments, the pixel values of the binary motion image may be either zero or one. In other embodiments, the pixel values may be 0 or 255. Exemplary video frames, binary motion images, and motion history images are shown in FIG. 9.

The binary motion image 812 is fed into a MHI updating module 814 which produces a motion history image. In the case where each frame of a video sequence is subsequently fed into the system 800, the output is a motion history image for each frame. The MHI updating module 814 also takes as an input the previously-calculated motion history image.

In one embodiment, the binary motion image 812 takes values of zero or one and the motion history image 818 takes integer values between 0 and 255. In this embodiment, one method of calculating the motion history image 818 is herein described. If the value of the binary motion image 812 at a given pixel location is one, the value of the motion history image 818 at that pixel location is 255. If the value of the binary motion image 812 at a given pixel location is zero, the value of the motion history image 818 is the previous value of the motion history image 820 minus some value, which may be denoted delta. If, at some pixel, the value of the calculated motion history image 818 would be negative, it is instead set to zero. In this way, motion which happened far in the past is represented in the motion history image 818, however, it is not as intense as motion which happened more recently. In one particular embodiment, delta is equal to one. However, delta may be equal to any integer value in this embodiment. In other embodiments, delta may have non-integer values or be negative. In another embodiment, if the value of the binary motion image 812 at a given pixel location is zero, the value of the motion history image 818 is the previous value of the motion history image 820 multiplied by some value, which may be denoted alpha. In this way, the history of motion decays from the motion history image 818. For example, alpha may be one-half. Alpha may also be nine-tenths or any value between zero and one.

The motion history image 818 output from the system 800, but is also input into a delay 816 to produce the previously-calculated motion history image 820 used by the MHI updater 814.

FIG. 9 is a diagram of a collection of frames of a video sequence, the associated binary motion images, and the motion history image of each frame. Four data frames 950a, 950b, 950c, 950d are shown, which represent a video sequence of an object 902 moving across the screen from left to right. The first two video frames 950a and 950b are used to calculate a binary motion image 960b. Described above is a system and method of producing a binary motion image 960b and motion history image 970b from two video frames. The first binary motion image 960b shows two regions of motion 904, 906. Each region corresponds to either the left of the right side of the object 902. The calculated motion history image 970b is identical to the binary motion image 960b as there is no previously-calculated motion history image. Alternatively, the previously-calculated motion history image can be assumed to be all zeros. Motion history image 970b shows regions 916, 918 corresponding to regions 906, 906 of the binary motion image 960b. The second frame 950b used in the calculation of the first motion history image 970b becomes the first frame used in the calculation of the second motion history image 970c. Using the two video frames 960b and 960c, a binary motion image 960c is formed. Again, there are two regions of motion 908, 910 corresponding to the left and right side of the object. The motion history image 970c is the binary motion image 960c superimposed over a "faded" version of the previously-calculated motion history image 970b. Thus regions 922 and 926 correspond to the regions 916 and 918, whereas the regions 920 and 924 correspond to the regions 908 and 910 of the binary motion image 960c. Similarly, a binary motion image 960d and motion history image 970d are calculated using video frames 950c and 950d. The motion history image 970d seems to show a "trail" of the objects motion.

Motion Center Determination

Figure 10:
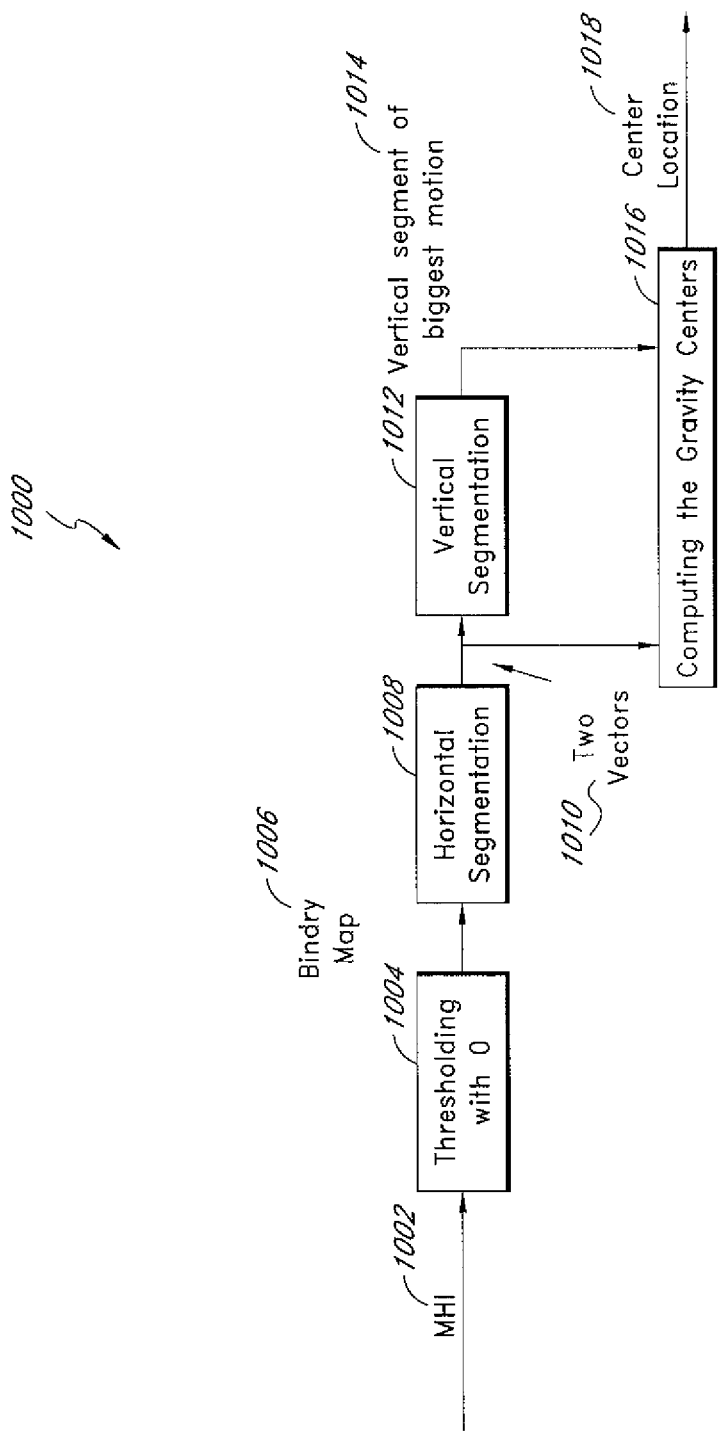
FIG. 10 is a functional block diagram of an embodiment of a system which determines one or more motion centers.

FIG. 10 is a functional block diagram of an embodiment of a system which determines one or more motion centers. The motion history image 1002 is input to the system 1000. The motion history image 1002 is input into a thresholding module 1004 to produce a binary map 1006. The thresholding module 1004 compares the value of the motion history image 1002 at each pixel to a threshold. If the value of the motion history image 1002 at a certain pixel location is greater than the threshold, the value of the binary map 1006 at that pixel location is set to one. If the motion history image 1002 at a certain pixel location is less than the threshold, the value of the binary map 1006 at that pixel location is set to zero. The threshold may be any value, for example, 100, 128, or 200. The threshold may also be variable depending on the motion history image, or other parameters derived from the video sequence. An exemplary binary map is shown in FIG. 11.

Motion segmentation is performed in two steps, horizontal segmentation, and vertical segmentation. The horizontal segmentation 1008 selects a line segment of moving area within that line, yielding an output of two values: start position and length of the segment. The horizontal segmentation 1008 may also output two values: start position and end position. Each row of the binary map 1006 is analyzed by the horizontal segmentation module 1008. In one embodiment, for each row of the binary map 1006, two values are output: the start position of the longest horizontal segment, and the length of the longest horizontal segment. Alternatively, the two output values may be the start position of the longest horizontal segment and the stop position of the longest horizontal segment. In other embodiments, the horizontal segmentation module 1008 may output values associated with more than one horizontal segment.

A horizontal segment, in one embodiment, is a series of ones in a row of a binary map. The row of the binary map may undergo pre-processing before horizontal segments are identified. For example, if a single zero is found in the middle of a long string of ones, the zero may be flipped and set to one. Such a "lone" zero may be adjacent to other zeros in the image, but not in the row of the image. Also, a zero, may be considered a lone zero if it is at the edge of an image and not followed or preceded by another zero. More generally, if a series of zeros have a longer series of ones on either side, the entire series of zeros may be set to one. In other embodiments, the neighboring series of ones may be required to be twice as long as the series of zeros for flipping to take place. This, and other pre-processing methods, reduce noise in the binary map.

The two resultant vectors 1010 from the horizontal segmentation, e.g. the start position and length of the longest horizontal segment for each row of the binary map, are input into the vertical segmentation module 1012. In the vertical segmentation module 1012, which may be a separate module or part of the horizontal segmentation module 1008, each row of the binary map is marked as 1 if the length of the longest horizontal segment is greater than a threshold, and 0 otherwise. Two consecutive 1 s in this sequence are considered connected if the two corresponding horizontal segments have an overlap exceeding some value. The overlap can be calculated using the start position and length of the respective motion segments. In one embodiment, an overlap of 30% is used to indicate that consecutive horizontal segments are connected. Such a connection is transitive, e.g. a third consecutive 1 in the sequence may be connected to the first two.

Each sequence of connected 1 s defines a vertical segment. A size is associated with each vertical segment. The size may be, in one embodiment, the number of connected 1 s, e.g. the length of the vertical segment. The size may also be the number of pixels associated with the vertical segment, calculable from the lengths of the horizontal segments. The size may also be the number of pixels associated with the vertical segment having some characteristic, such as a color similar to a skin tone, thus enabling tracking of human hands.

The vertical segment (or segments) with the greatest size 1014, as well as the vectors 1010 from the horizontal segmentation module 1008 and the MHI 1002 are input into a motion center computation module 1016. The output of the motion center computation module 1016 is a location associated with each input vertical segment. The location may correspond to a pixel location, or may be between pixels. The motion center, in one embodiment, is defined as a weighted average of the pixel locations associated with the vertical segment. In one embodiment, the weight of a pixel is the value of the motion history image at that pixel location if the value of the motion history image is above a threshold and zero otherwise. In other embodiments, the weight of a pixel is uniform, e.g. 1, for each pixel.

FIG. 11 is a diagram of a binary map which may be utilized in performing one or more of the methods described herein. The binary map 1100 is first input into a horizontal segmentation module 1008 which identifies the horizontal segments of each row of the binary map. The module 1008 then produces outputs defining the start location and length of the longest horizontal segment for each row. For row 0 of FIG. 11, there are no horizontal segments, as the binary map is composed of all zeros. In row 1, there are two horizontal segments, one starting at index 0 of length 3, and another starting at index 10 of length 4. In some embodiments, the horizontal segmentation module 1008 could output both of these horizontal segments. In other embodiments, only the longest horizontal segment (e.g., the one starting at index 10) is output. In row 2, there are either one, two, or three horizontal segments depending on the embodiment of the system used. In one embodiment lone zeros surrounded by ones (such as the zero at index 17) are changed into ones before processing. In another embodiment, sequences of zeros surrounded by longer sequences of ones (such as the sequence of two zeros at indices 7 and 8) are changed into ones before processing. In such an embodiment, one horizontal segment starting at index 4 of length 17 is identified. Identified horizontal segments, using one embodiment of the invention, are indicated in FIG. 6 by underline. Also, each row is marked either 1 or 0 on the right of the binary map if the longest horizontal segment is of length five or more. In other embodiments, a different threshold may be used. The threshold may also change depending on characteristics of other rows, e.g., neighboring rows.

Multiple Motion Center Determination

Another embodiment of the motion center analysis subsystem 134 uses a method of associating motion centers with identified objects in each frame of a provided video stream comprising sequentially performing horizontal and vertical segmentation of a motion history image, identifying the relevant objects, and associating motion centers with each of those objects.

In one embodiment, the three largest moving objects are identified and motion centers are associated with those objects for each frame of a video sequence. The invention should not be limited to the three largest moving objects, since any number of objects could be identified. For example, only two objects, or more than three objects could be identified. In some embodiments, the number of objects identified varies throughout the video sequence. For example, in one portion of a video sequence two objects are identified and in another portion, four objects are identified.

Figure 12:
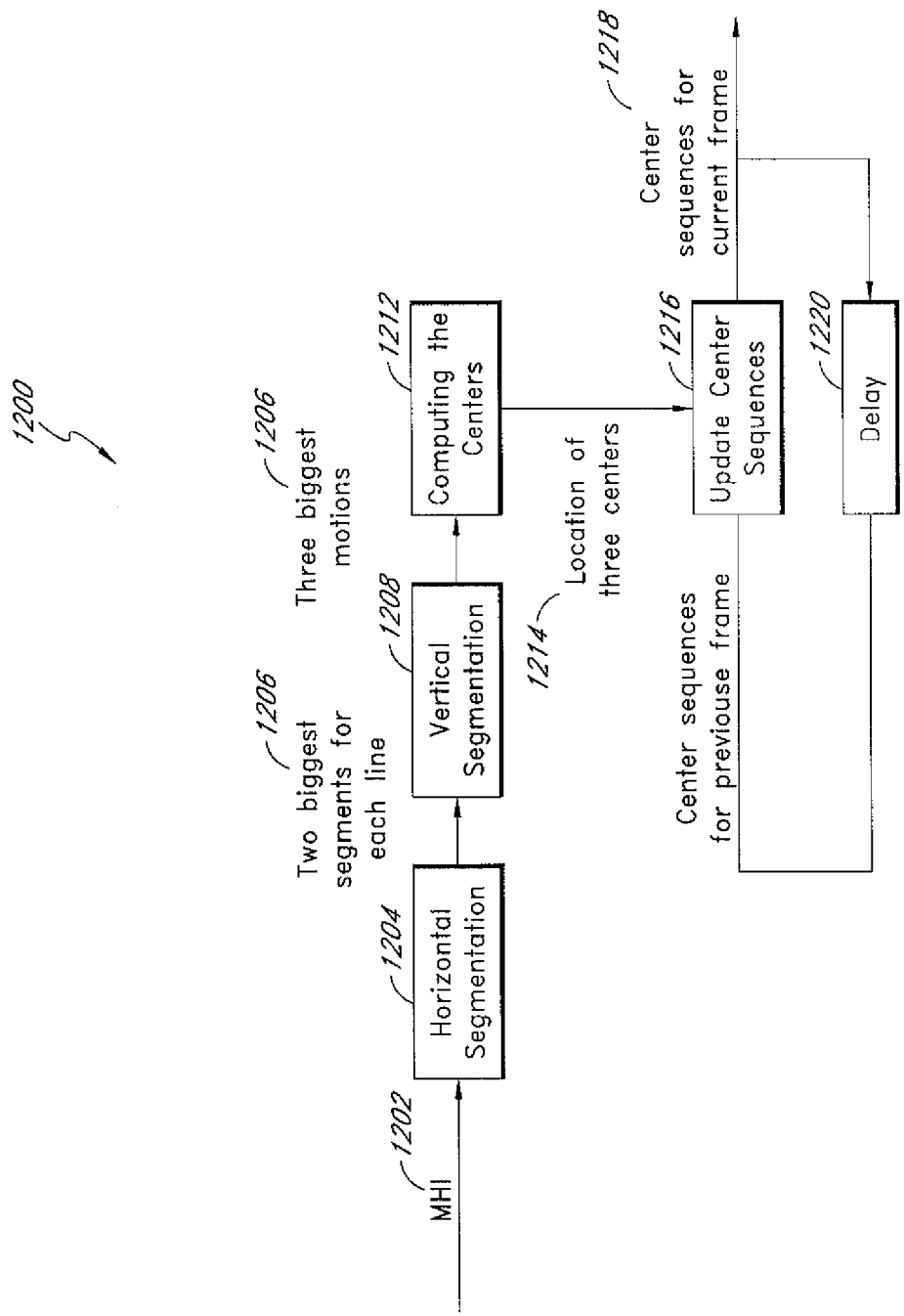
FIG. 12 is a functional block diagram illustrating a system capable of determining one or more motion centers in a video sequence.

FIG. 12 is a functional block diagram illustrating a system capable of determining one or more motion centers in a video sequence. The system 1200 comprises a horizontal segmentation module 1204, a vertical segmentation module 1208, a motion center computation module 1212, a center updating module 1216, and a delay module 1220. The horizontal segmentation module 1204 receives a motion history image 1202 as an input, and produces horizontal segments 1206 for each row of the motion history image 1202. In one embodiment, the two largest horizontal segments are output. In other embodiments, more or less than two horizontal segments may be output. In one embodiment, each row of the motion history image 1202 is processed as follows: a median filter is applied, the monotonic changing segments are identified, start points and lengths are identified for each segment, adjacent segments coming from the same objects are combined, and the largest segments are identified and output. This processing may be performed by the horizontal segmentation module 1204. Other modules shown or not shown may also be employed in performing steps of the processing.

The vertical segmentation module 1208 receives the horizontal segments 1206 as an input, and outputs object motions 1210. In one embodiment, the three largest object motions are output. In other embodiments more or less than three object motions may be output. In one embodiment, only the largest object motion is output. The object motions 1210 are input into the motion center determining module 1212 which outputs motion centers 1214 for each of the object motions 1210. The process of determining the motion centers in the determining module 1212 is explained hereinafter. The newly determined motion centers 1214, along with information previously determined associating motion centers and object motions 1222, are used by the center updating module 1216 to associate the newly calculated motion centers 1214 with the object motions.

Figure 13:
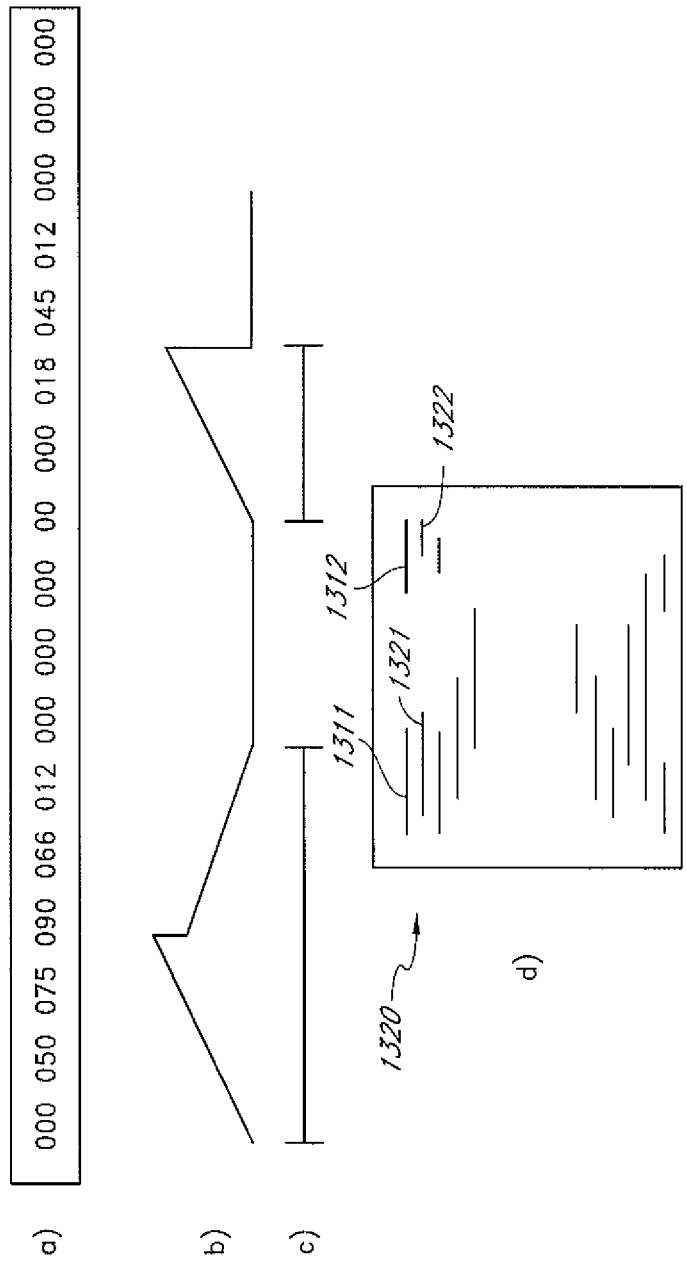

Horizontal segmentation, according to one embodiment of the development, may best be understood by means of an example. FIG. 13*a* is an exemplary row of a motion history image. FIG. 13*b* is diagram which represents the row of the motion history image of FIG. 13*a* as monotonic segments. FIG. 13*c* is a diagram illustrating two segments derived from the row of the motion history image of FIG. 13*a*. FIG. 13*d* is a diagram illustrating a plurality of segments derived from an exemplary motion history image. Each row of the motion history image may be processed by the horizontal segmentation module 1304 shown in FIG. 13. In one embodiment, a median filter is applied to the row of the motion history image as part of the processing. The median filter may smooth the row and remove noise. The exemplary row of FIG. 13*a* can also be represented as a collection of monotonic segments as shown in FIG. 13*b*. The first segment, corresponding to the first four elements in the exemplary row, is monotonically increasing. This segment is followed immediately by a monotonically decreasing segment corresponding to the next three elements in the exemplary row. Another monotonic segment is identified in the latter half of the row. Adjacent, or near-adjacent, monotonic segments likely coming from the same object may be combined into a single segment for the purposes of further processing. In the example shown in FIG. 8, two segments are identified. The start location and length of these identified segments may be saved into a memory. Further information about the segments may be ascertained by further analyzes of the segments. For example, the number of pixels in the segment having a certain characteristic may be identified. In one embodiment, the number of pixels in the segment having a color characteristic, such as a skin tone, may be ascertained and stored.

FIG. 13d shows an exemplary result of the horizontal segmentation applied to many rows of the motion history image. Vertical segmentation may be performed to associated horizontal segments in different rows. For example, on the second row 1320 of FIG. 13d, there are two identified segments 1321 and 1322, each segment overlapping a significant number of columns with a different segment of the row above 1311 and 1312. The decision to associate two segments in different rows may be based on any of a number of characteristics of the segments, for example, how much they overlap one another. This process of association, or vertical segmentation, as applied to the example of FIG. 13d, results in defining three object motions, a first motion corresponding to motion in the upper left, a second in the upper right, and a third towards the bottom of the motion history image.

In some embodiments, more than one segment in a row may be associated with a single segment in an adjacent row, thus the vertical segmentation processing need not be one-to-one. In other embodiments, processing rules may be in place to ensure one-to-one matching to simplify processing. Each object motion may be associated with a pixel number count, or a count of the number of pixels with a certain characteristic. In other applications of the method, more or less than three object motions may be identified.

For each object motion, a motion center is defined. The motion center may be calculated, for example, as a weighted average of the pixel locations associated with the object motion. The weight may be uniform or based on a certain characteristic of the pixel. For example, pixels having a skin tone matching a person may be given more weight than, for example, blue pixels.

The motion centers are each associated with an object motion which corresponds to an object captured by the video sequence. The motion centers identified in each image may be associated appropriately to the object from which they derive. For example, if a video sequence is of two cars passing each other in opposite directions, it may be advantageous to track a motion center of each vehicle. In this example, two motion centers would approach each other and cross. In some embodiments, the motion centers may be calculated from top to bottom and from left to right, thus the first motion center calculated may correspond to the first vehicle in the first half of the sequence and the second vehicle after the vehicles have passed each other. By tracking the motion centers, each motion center may be associated with an object, irrespective of the relative locations of the objects.

In one embodiment, a derived motion center is associated with the same object as a previously-derived motion center if the distance between them is below a threshold. In another embodiment, a derived motion center is associated with the same object as the nearest previously-derived motion center. In yet another embodiment, trajectories of the objects, based on previously-derived motion history may be used to anticipate where a motion center may be, and if a derived motion center is near this location, the motion center is associated with the object. Other embodiments may employ other uses of trajectory.

Detection of a Circular Shape

As described above with respect to FIG. 1, embodiments of the invention comprise a trajectory analysis subsystem 136. The trajectory analysis subsystem 136 may be used in the process 200 of FIG. 2 to determine if the trajectory defined by the determined motion centers defines a recognized gesture.

One type of recognized gesture is a circular shape. One embodiment of a method of detecting a circular shape is described below.

Figure 14:
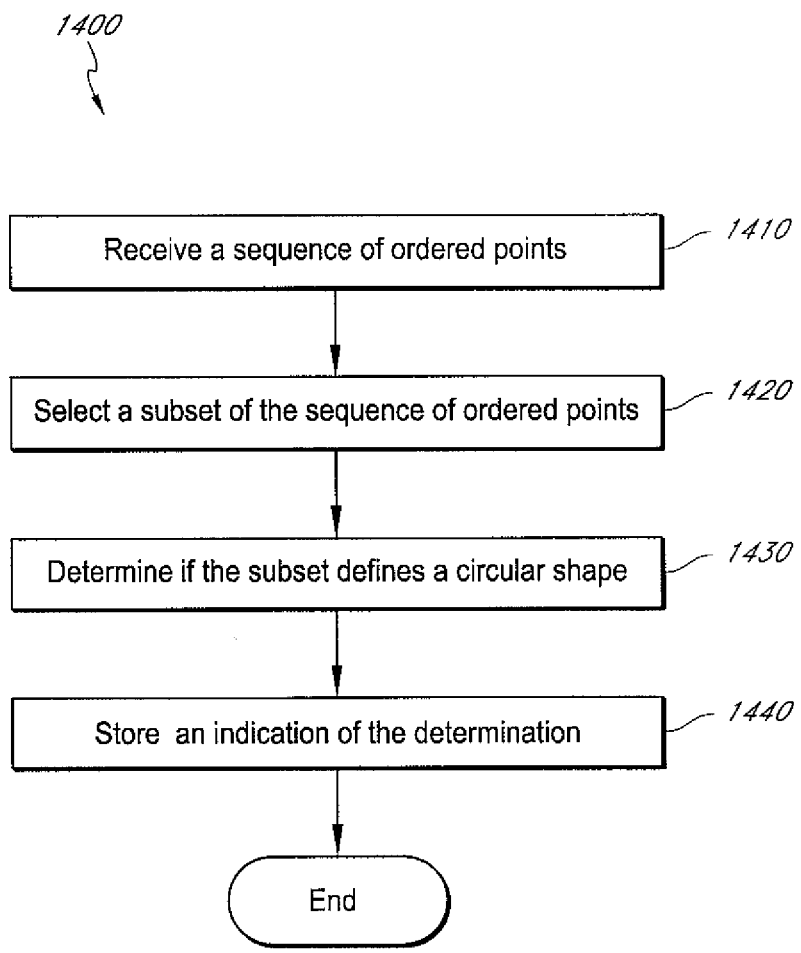
FIG. 14 is a flowchart illustrating a method of detecting a circular shape in a sequence of ordered points.

FIG. 14 is a flowchart illustrating a method of detecting a circular shape in a sequence of ordered points. The process 1400 begins, in block 1410, by receiving a sequence of ordered points. As described above, the sequence of ordered points may derive from a number of sources. The sequence is ordered, i.e., at least one point is successive to (or later than) another point of the sequence. In some embodiments, each of the points of the sequence has a unique place in the order. Each point describes a location. The location may be expressed, for example, in Cartesian coordinates or polar coordinates. The location may also be expressed in more than two dimensions.

In block 1420, a subset of the received sequence of ordered points is selected. Prior to selection, or as part of the selection process, the sequence may be subjected to pre-processing, such as filtering or down-sampling. Application of a median filter is a non-linear processing technique which, in one embodiment, replaces the x- and y-coordinate of each point with the respective median of the x- and y-coordinates of the point itself and neighboring points. In one embodiment of the process 1400, the sequence is filtered with a median filter of three points to reduce spike noise. Application of an averaging filter is a linear processing technique which, in one embodiment, replaces the x- and y-coordinates of each point with the respective average of the x- and y-coordinates of the point itself and neighboring points. In another embodiment of the process 1400, the sequence is filtered with an averaging filter of five points to smooth the curve. In other embodiments, the sequence is replaced with a different sequence based on the original sequence using a curve-fitting algorithm. The curve-fitting algorithm may be based on polynomial interpolation, or fitting to conic section or trigonometric function. Such an embodiment serves to capture the essence of the shape, while reducing noise. However, the complexity of a good curve-fitting algorithm is high and may, in some cases, undesirably distort the original input signal.

After any pre-processing on the sequence, a subset of the sequence is extracted for further analysis. In one embodiment, each contiguous subset of the sequence having a length falling within a predefined range is analyzed. For example, if a point corresponding to time t has been received, a plurality of subsets corresponding to different lengths N are selected for analysis, where each subset includes the points corresponding to times t, t-1, t-2, t-3, . . . , and t-N.

In another embodiment, the sequence is analyzed to determine subsets that are likely to define a circular shape. For example, the sequence may be analyzed in a first direction, such as in the x-coordinate direction, to determine a number of maximums and/or minimums. A first segment may be defined as the points between two similar extrema in the first direction. The sequence may then be analyzed in a second direction, such as the y-coordinate direction, to determine a number of maximums and/or minimums. A second segment may be defined as the points between two similar extrema in the second direction. Knowledge of these segments may be used in the selection of a subset.

Figure 15:
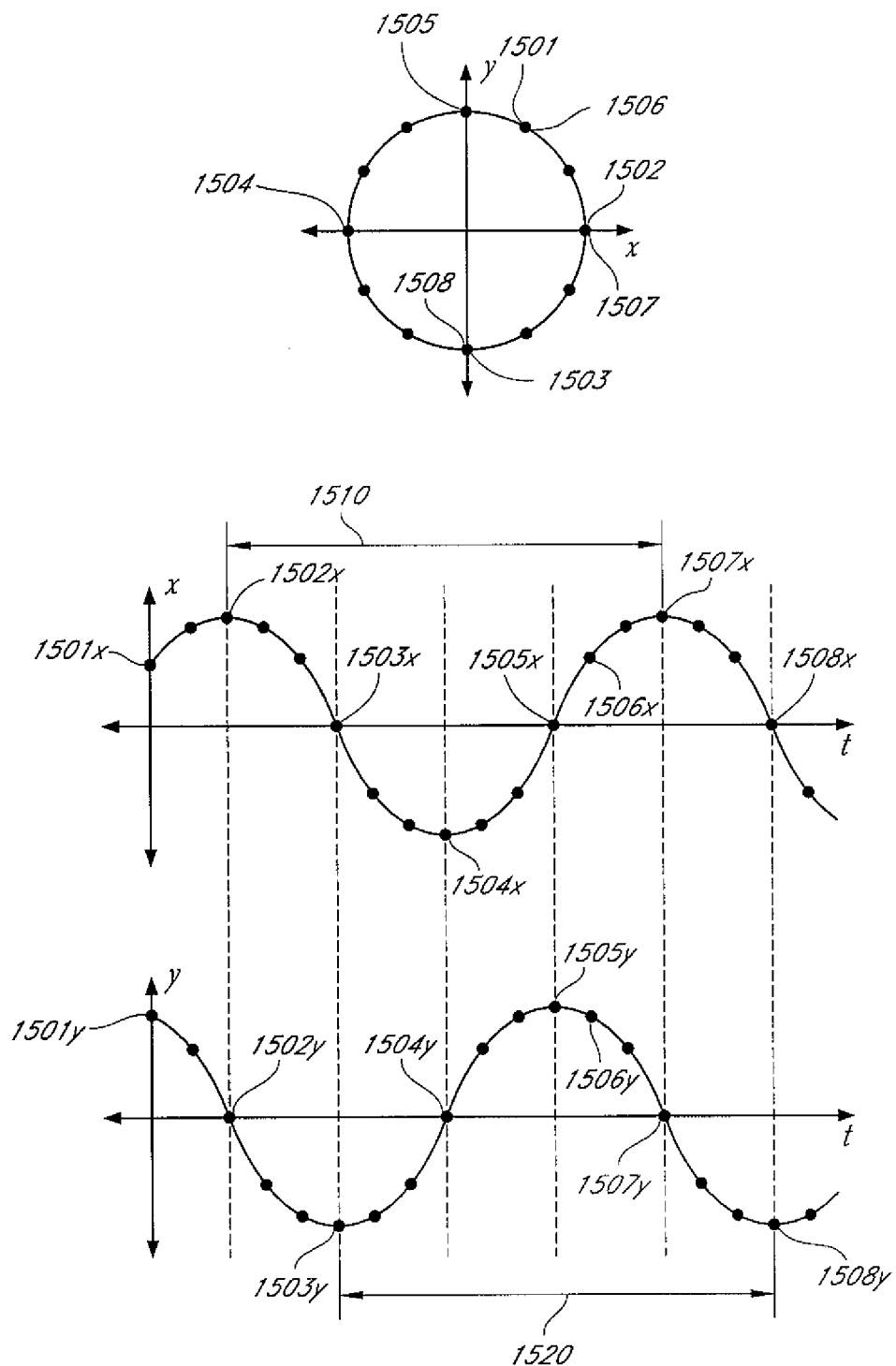
FIG. 15 is a diagram of the x- and y-coordinates of a set of ordered points derived from circular motion.

FIG. 15 is a diagram of the x- and y-coordinates of a set of ordered points derived from circular motion. The set of ordered points begins at point 1501 and proceeds in a clockwise motion to points 1502, 1503, 1504, and 1505, and continues through point 1506, which is collocated with point 1501 to points 1507 and 1508, which are collocated with points 1502 and 1503, respectively. The x- and y-coordinates of the set of ordered points are also shown with respect to time. At point 1501, neither of the coordinates are at a maximum or a minimum. Once point 1502 is reached, the x-coordinate is at a maximum. At point 1503, the y-coordinate is at a minimum. At point 1504, the x-coordinate is at a minimum, and at point 1505, the y-coordinate is at a maximum. When the set of ordered points reaches point 1507, the x-coordinate is again at a maximum, indicated by 1507*x*. Thus far, the set of ordered points have defined two maximums in the x-coordinate, indicated by 1502*x* and 1507*x*. A first segment 1510 may be defined as the points between (inclusive or non-inclusive) the two maximums 1502*x* and 1507*x*. When the set of ordered points reaches point 1508, the y-coordinate is again at a minimum, indicated by 1508*y*. Having defined two minimums in the y-coordinate, indicated by 1503*y* and 1508*y*, a second segment 1520 may be defined as the points between the two minimums 1503*y* and 1508*y*.

If the set of ordered points defines a perfectly circular motion the two segments 1510 and 1520 will overlap by 75%. This fact may form the basis for selecting the subset of the sequence of ordered points based on the first and second segment. For example, in some embodiments, a subset is selected if the first and second segments overlap by 50%, 70%, or 75%. In other embodiments, the amount of overlap of the first and second segments must be greater than a selected threshold. The selected subset may comprise the first segment, the second segment, or both the first and second segments, or simply be based on at least one of the first or second segment. For example, if the the first segment includes points n, n+1, n+2, ..., n+L, a number of subsets may be selected for analysis including enlarged, reduced, or shifted versions of the segment. For example, the subset may be enlarged to include the points n−2 to n+L+2, reduced to include the points n+2 to n+L−2, or shifted to include the points n−2 to n+L−2.

The selected subset need not consist of contiguously ordered points. As described above, the original sequence of ordered points may be down-sampled. The selected subset may comprise every other point of a period, every third point of a period, or even specifically selected points of a period. For example, points overly distorted due to noise may be discarded, or not selected.

After the subset is selected, it is determined if the subset defines a circular shape in block 1430 of FIG. 14. A number of parameters may be ascertained from the subset which may be used to indicate whether or not the subset defines a circular shape. Each of these parameters and indications may be used individually or in conjunction in the determination. For example, if one rule based on the parameters indicates that the subset defines a circular shape, but another rule indicates that the subset does not define a circular shape, these indications may be weighted and combined appropriately. In other embodiments, if any rule indicates that the subset does not define a circular shape, it is concluded that the subset does not define a circular shape and further analysis ceases.

Figure 16:
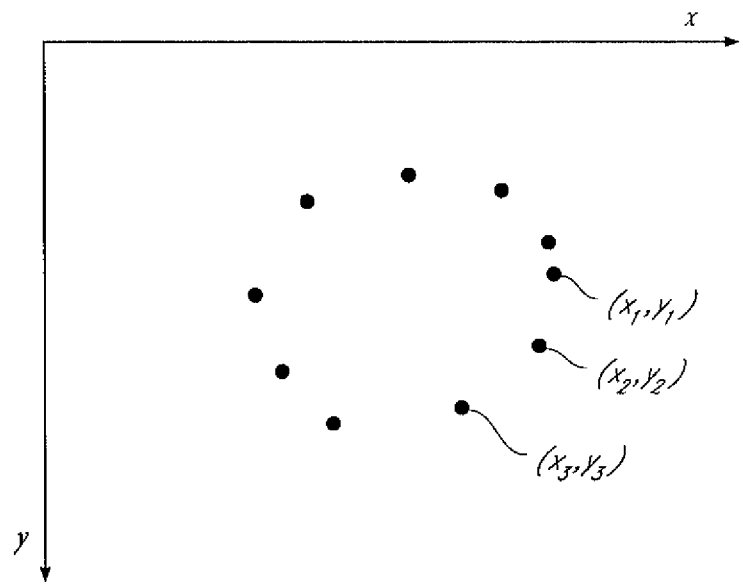
FIG. 16 is a plot of an exemplary subset of ordered points.

A number of parameters and indications based on the parameters are described in detail below with reference to an example. Other parameters and indications which are not described may also be included in the determination of whether the subset defines a circular shape. FIG. 16 is a plot of an exemplary subset of ordered points, which will be used in describing a number of such parameters.

Figure 17:
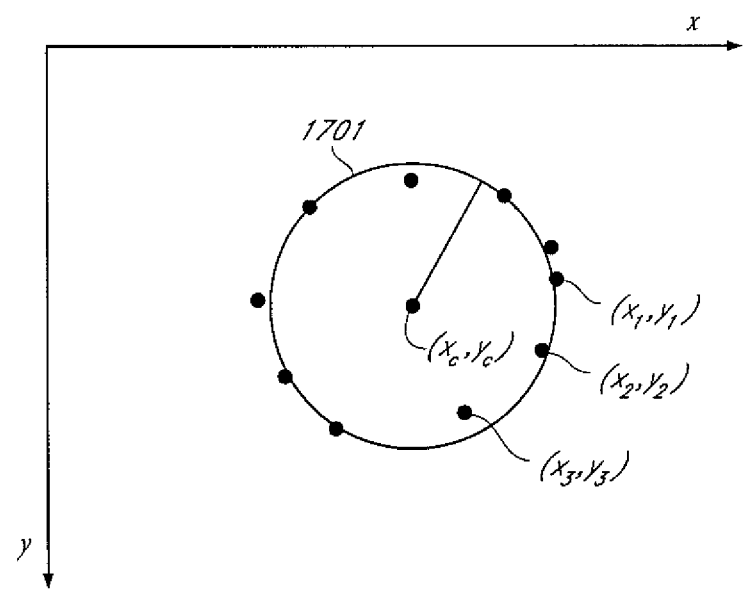
FIG. 17 is a plot illustrating the determination of the mean-squared error with respect to the exemplary subset of FIG. 16.

One parameter that may aid in the determination of whether a subset of ordered points, such as the exemplary subset of FIG. 16, defines a circular shape is the mean-squared error from a circle. FIG. 17 is a plot illustrating the determination of the mean-squared error with respect to the exemplary subset of FIG. 16. A circle 1701 with center $(x_c, y_c)$ and radius r is shown superimposed over the exemplary subset of ordered points. The mean-squared error, which corresponds to the average distance between the points of the subset and the proposed circle, may be used in determining whether the subset defines a circular shape. The mean-squared error may be defined, for example, by the following equation:

$$e = \frac{1}{N}\sum_{i=1}^{N}\left|\sqrt{(x_i - x_c) + (y_i - y_c)} - r\right|^2,$$

where $x_i$ and $y_i$ are the x- and y-coordinates of the $i^{th}$ point of the subset, N is the number of points in the subset, $x_c$ and $y_c$ are the x- and y-coordinates of the center of the circle which minimizes the mean-squared error, and r is the radius of the circle which minimizes the mean-squared error. The center and radius of the circle which minimizes the mean-squared error may be found in a number of ways known to those skilled in the art, including iteratively or by taking the derivate of the above equation with respect to each unknown parameter and setting it to zero. The mean-squared error may be used to provide an indication of whether the subset defines a circular shape by comparing the error to a threshold. If the error is below the threshold, then it may be determined that the subset defines a circular shape. Alternatively, the mean-squared error may just be one of a number of analyzed parameters used in the determination.

Figure 18:
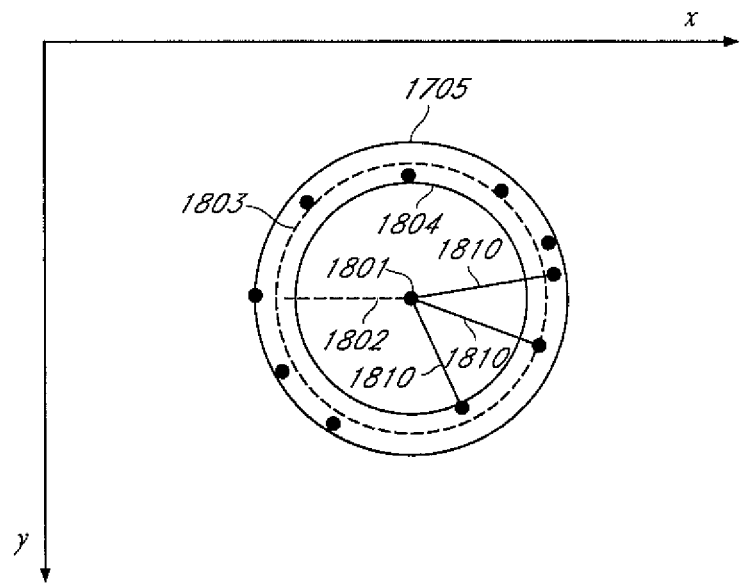
FIG. 18 is a plot illustrating derivation of a distance-based parameter for use in determining whether a subset of ordered points defines a circular shape with respect to the subset of FIG. 16.

The mean-squared error may, in some embodiments, be too computationally intensive to enable real-time application. A simpler method is now described with reference to FIG. 18. FIG. 18 is a plot illustrating derivation of a distance-based parameter for use in determining whether a subset of ordered points defines a circular shape with respect to the subset of FIG. 16. First, a prospective center 1801 of the subset is defined. The prospective center 1801 may be the average location of the points of the subset, a weighted average, or the center derived above which minimizes the mean-squared error. The prospective center 1801 may be iteratively calculated to remove outliers from the subset. For example, the prospective center 1801 may be calculated such that the x- and y-coordinates are defined by the following equations:

$$x_c = \frac{1}{N}\sum_{i=1}^{N} x_i$$

and $$y_c = \frac{1}{N}\sum_{i=1}^{N} y_i,$$

where $x_i$ and $y_i$ are the x- and y-coordinates of the $i^{th}$ point of the subset, N is the number of points in the subset, $x_c$ and $y_c$ are the x- and y-coordinates of the prospective center 1801.

For each of the points of the subset (or perhaps some subset thereof), a distance 1810 is calculated between the point and the prospective center 1801. The distance may be any distance metric known by those skilled in the art. For example, the 1-norm distance, the 2-norm distance, or the infinity-norm distance may be used. The 1-norm distance, defined in two dimensions as $d_1 = |x_c - x_1| + |y_c - y_1|$, may aid in reducing the computational complexity of the method. The 2-norm distance, defined in two dimensions as $d_i = \sqrt{(x_c - x_i)^2 + (y_c - y_1)^2}$, may aid in the robustness of the method.

A prospective radius may also be defined in a similar manner, e.g., as the average distance between the center and the points. For illustrative purposes, a circle 1803 defined by the prospective center 1801 and prospective radius 1802 is shown in FIG. 18. The prospective radius 1802 may also be used in the determination that the subset defines a circular shape. It may be determined that the subset does not define a circular shape if the number of distances within a determined range of the prospective radius, illustrated by circles 1804 and 1805, exceeds a threshold. The prospective radius 1802 may be used in the determination in other ways, for example, if the prospective radius is too small (below a threshold), it may be determined that the subset does not define a circular shape.

Figure 19:
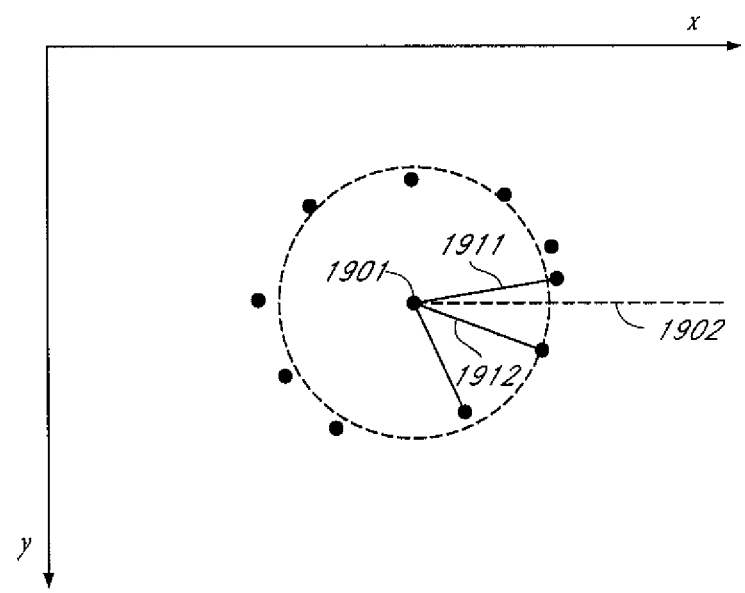
FIG. 19 is a plot illustrating derivation of an angle-based parameter for use in determining whether a subset of ordered points defines a circular shape with respect to the subset of FIG. 16.

Determination of whether a circular shape is defined may also be based on angle correlation, which takes advantage of the fact that the points are ordered. FIG. 19 is a plot illustrating derivation of an angle-based parameter for use in determining whether a subset of ordered points defines a circular shape with respect to the subset of FIG. 16. For each of the points of the subset (or perhaps some subset thereof), an angle is determined. One way of determining the angle for a point of the subset is to calculate a prospective center 1901 in the same or a different manner than above, and to determine the angle between a zero angle line 1902 and a line defined between the prospective center and the point. The zero angle line may be at the 3 o'clock position with angle increasing counter-clockwise, or at the 12 o'clock position with angle increasing clockwise.

A comparative angle profile may also be determined, which, in some embodiments, has the same number of points as the subset, increases in the same direction (clockwise or counter-clockwise) as the determined angles, and starts at the angle determined for the first point of the subset. Additionally, the comparative angle profile may consist of equally spaced angles. For example, if the determined angles are $\theta_1, \theta_2, \ldots, \theta_N$, the comparative angle profile may be $\theta_1$, $$\theta_1 + \frac{360}{N-1}, \theta_1 + 2\frac{360}{N-1}, \ldots, \theta_1 + (N-1)\frac{360}{N-1}.$$

As another example, if the determined angles are [0, 86, 178, 260, 349], a comparative angle profile may be determined as [0, 90, 180, 270, 360]. The angles may be measured in degrees, radians, or any other unit.

A similarity value may be determined by comparing the defined angles for each point of the subset and the comparative angle profile. The similarity value may be calculated in a number of ways. For example, if the defined angles and the comparative angle profile are represented as vectors, the distance between the vectors may be calculated using a distance metric known to those skilled in the art, such as the distance in the $L_1$-space, $L_2$-space, or $L_\infty$-space. Alternatively, the angle correlation may be calculated using the following standard equation:

$$\rho_{X,Y} = \frac{E(XY) - E(X)E(Y)}{\sqrt{E(X^2) - E^2(X)}\sqrt{E(Y^2) - E^2(Y)}},$$

where E denotes the expected value, or average value in this case, X is a vector representing the determined angles, and Y is a vector representing the comparative angle profile. Applied to the example above, where a vector representing the determined angles is [0, 86, 178, 260, 349] and a vector representing the comparative angle profile is [0, 90, 180, 270, 360], $$E(X) = \frac{1}{5}(0 + 86 + 178 + 260 + 349) = 174.6,$$

$$E^2(X) = 174.6^2 = 30485.16,$$

$$E(X^2) = \frac{1}{5}(0^2 + 86^2 + 178^2 + 260^2 + 349^2) = 228481,$$

$$E(Y) = \frac{1}{5}(0 + 90 + 180 + 270 + 360) = 180,$$

$$E^2(Y) = 180^2 = 32400,$$

$$E(Y^2) = \frac{1}{5}(0^2 + 90^2 + 180^2 + 270^2 + 360^2) = 243000,$$

$$E(XY) = \frac{1}{5}(0 \cdot 0 + 86 \cdot 90 + 178 \cdot 180 + 260 \cdot 270 + 349 \cdot 360)$$
$$= 235620,$$

and $$\rho_{X,Y} = \frac{235620 - 174.6 \cdot 180}{\sqrt{228481 - 30485.16}\sqrt{243000 - 32400}}$$
$$\approx .999958.$$

The similarity value may also be calculated using vectors based on the determined angles and comparative angle profile that are centered, e.g., such that the mean is zero, or normalized, such that the norm is one. The similarity value can be compared to a threshold to determine whether or not the subset defines a circular shape. For example, if the similarity value is below the threshold, it may be determined that the subset does not define a circular shape.

The determined angles may also be used to determine angle differences between pairs of consecutive points of the subset. The angle difference may be determined by the absolute value of the difference of the two already-determined angles. If there are two points on different sides of the zero angle line, the difference between the determined angles may not be representative of the angle between two lines defined between the prospective center and the points. For example, in the plot of FIG. 19, the angle between line 1911 and the zero angle line might be determined to be 10 degrees and the angle between line 1912 and the zero angle line might be determined to be 340 degrees. Using the above angle difference algorithm, the angle difference may be determined as 330 degrees despite the fact that the angle between lines 1911 and 1912 is only 30 degrees. This phenomenon is referred to as an "angle jump." The angle differences may be changed to compensate for this by calculating the angle difference between these two angles to be only 30 degrees instead of 330. Alternatively, the angle differences may be determined directly by finding the angle between two lines connecting the prospective center 1901 with consecutive points. This method increases the computational complexity of the algorithm, but reduces the need to account for angle jumps.

The number of angle jumps is another parameter that may be used to determine if the subset defines a circular shape. If more than one angle jump is detected, for example, it may be determined that the subset does not define a circular shape, as this would indicate that points have crossed the zero angle line 1902 more than once. The angle differences (before or after accounting for angle jumps) may also be used to determine if the subset defines a circular shape. For example, it may be determined that the subset defines a circular shape if the number of angle differences larger than a first threshold is less than a second threshold. This may indicate that the circle is smooth and consists of angles such as [10, 20, 30, 40, ..., 360], rather than [90, 180, 270, 360], which could be a square.

Figure 20:
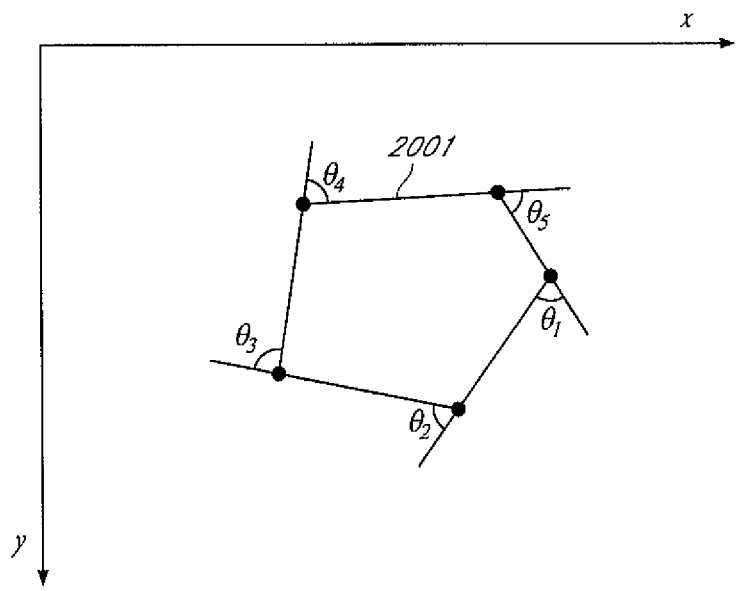
FIG. 20 is a plot illustrating derivation of a direction-based parameter for use in determining whether a subset of ordered points defines a circular shape with respect to the subset of FIG. 16.

The direction of the subset (clockwise or counter-clockwise) can also be determined and used as a rule in determining if the subset defines a circular shape. FIG. 20 is a plot illustrating derivation of a direction-based parameter for use in determining whether a subset of ordered points defines a circular shape with respect to the subset of FIG. 16. Segments connecting adjacent points of the subset (or, as in the case of FIG. 20, some subset thereof) define a polygon 2001 having a number of outer angles. The outer angle at each point of the polygon 2001 is the angle between the extended line segment from the previous point and the line segment of polygon 2001. The angle can be found using any of a number of geometric methods known to those skilled in the art. If the sum of the outer angles is within a predefined range of a first value (e.g. 360 degrees), it may be determined that the subset defines a circular shape with a clockwise direction. If the sum of the outer angles is within a predefined range of a second value (e.g. −360 degrees), it may be determined that the subset defines a circular shape with a counter-clockwise direction. If the sum of the outer angles does not fall within either range, it may be determined that the subset does not define a circular shape.

In block 1440 of FIG. 14, an indication of the determination is stored in a memory. The indication may indicate that the subset defines a circular shape or does not define a circular shape. The indication may also indicate that a clockwise or counterclockwise circular shape is defined by the subset.

The method described above may be used to analyze a sequence of ordered points to detect a circular shape. Depending on the parameters and thresholds chosen, the circular shape detected may be any of a number of shapes, such as a circle, an ellipse, an arc, a spiral, a cardioid, or an approximation thereof. The method has a number of practical applications. As described, in one application, a video sequence of hand gestures may be analyzed to control a device, such as a television.

Detection of a Waving Motion

The trajectory analysis subsystem 136 may be used in the process 200 of FIG. 2 to determine if the trajectory defined by the determined motion centers defines a recognized gesture. Another type of recognized gesture is a waving motion. One embodiment of a method of detecting a waving motion is described below.

Figure 21:
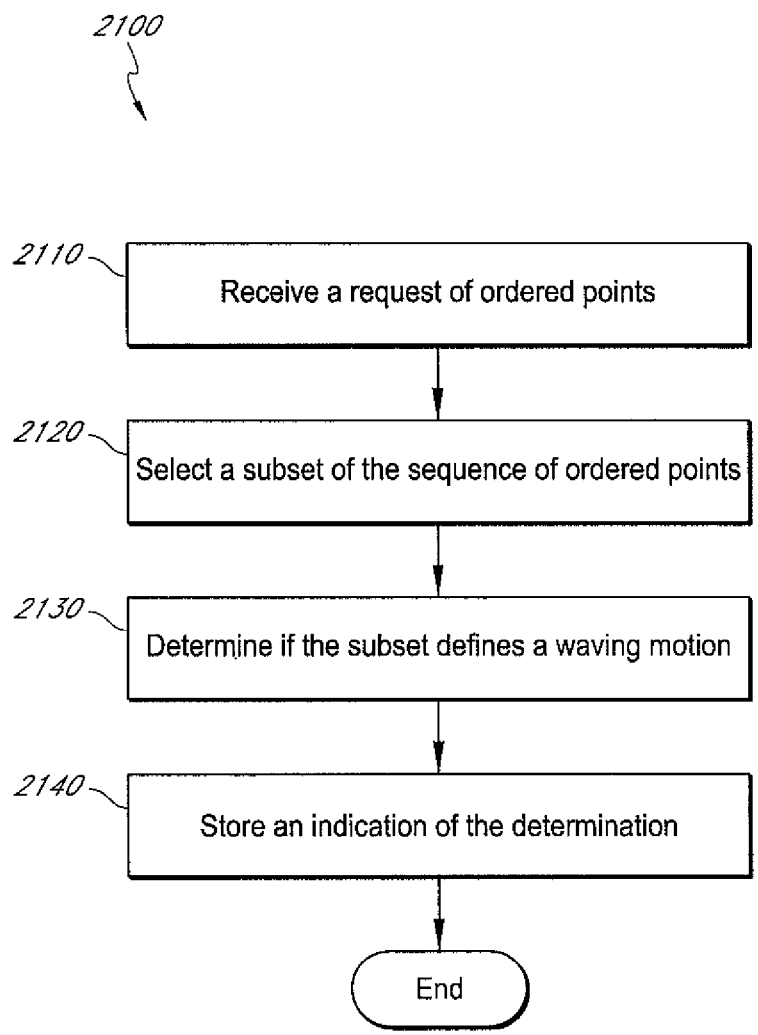
FIG. 21 is a flowchart illustrating a method of detecting a waving motion in a sequence of ordered points.

FIG. 21 is a flowchart illustrating a method of detecting a waving motion in a sequence of ordered points. The process 2100 begins, in block 2110, by receiving a sequence of ordered points. As described above, the sequence of ordered points may derive from a number of sources. The sequence is ordered, i.e., at least one point is successive to (or later than) another point of the sequence. In some embodiments, each of the points of the sequence has a unique place in the order. Each point describes a location. The location may be expressed, for example, in Cartesian coordinates or polar coordinates. The location may also be expressed in more than two dimensions.

In block 2120, a subset of the received sequence of ordered points is selected. Prior to selection, or as part of the selection process, the sequence may be subjected to pre-processing, such as filtering or down-sampling. Application of a median filter is a non-linear processing technique which, in one embodiment, replaces the x- and y-coordinate of each point with the respective median of the x- and y-coordinates of the point itself and neighboring points. In one embodiment of the process 2100, the sequence is filtered with a median filter of three points to reduce spike noise. Application of an averaging filter is a linear processing technique which, in one embodiment, replaces the x- and y-coordinates of each point with the respective average of the x- and y-coordinates of the point itself and neighboring points. In another embodiment of the process 2100, the sequence is filtered with an averaging filter of seven points to smooth the curve. In other embodiments, the sequence is replaced with a different sequence based on the original sequence using a curve-fitting algorithm. The curve-fitting algorithm may be based on polynomial interpolation, or fitting to a conic section or trigonometric function. Such an embodiment serves to capture the essence of the motion, while reducing noise, however the complexity of a good curve-fitting algorithm is high and may, in some cases, undesirably distort the original input signal.

After any pre-processing on the sequence, a subset of the sequence is extracted for further analysis. In one embodiment involving a real-time acquisition system, the most recently acquired M points are selected. In a particular embodiment, the 128 most recent points are used. In another embodiment each contiguous subset of the sequence having a length falling within a predefined range is analyzed. For example, if a point corresponding to time t has been received, a plurality of subsets corresponding to different lengths N are selected for analysis, where each subset includes the points corresponding to times t, t-1, t-2, t-3, ..., and t-N. In another embodiment, the sequence is analyzed to determine subsets that are likely to define a waving motion.

The selected subset need not consist of contiguously ordered points. As described above, the original sequence of ordered points may be down-sampled. The selected subset may comprise every other point of a period, every third point of a period, or even specifically selected points of a period. For example, points overly distorted due to noise may be discarded, or not selected.

After the subset is selected, it is determined if the subset defines a waving motion in block 2130 of FIG. 21. A number of parameters may be ascertained from the subset which may be used to indicate whether or not the subset defines a waving motion. Each of these parameters and indications may be used individually or in conjunction in the determination. For example, if one rule based on the parameters indicates that the subset defines a waving motion, but another rule indicates that the subset does not define a waving motion, these indications may be weighted and combined appropriately. In other embodiments, if any rule indicates that the subset does not define a waving motion, it is concluded that the subset does not define a waving motion and further analysis ceases.

Figure 22:
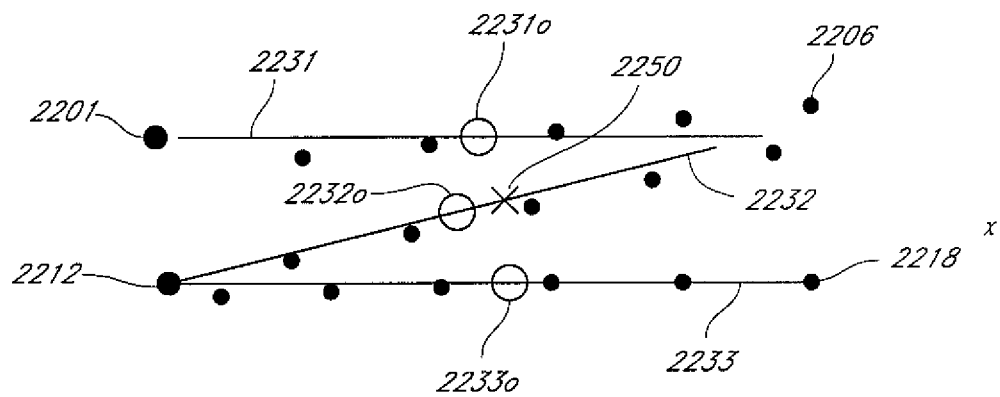
FIG. 22 is a plot of another exemplary subset of ordered points.
Figure 22:
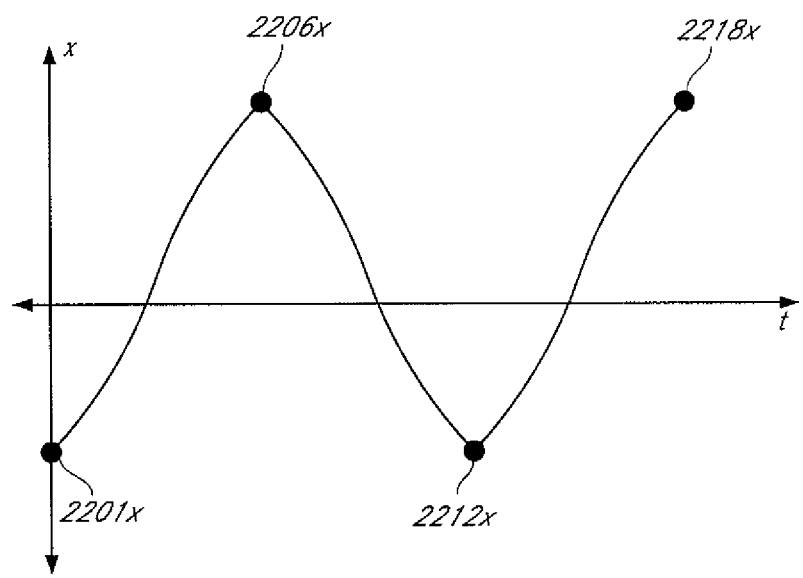

A number of parameters and indications based on the parameters are described in detail below with reference to an example. Other parameters and indications which are not described may also be included in the determination of whether the subset defines a waving motion. FIG. 22 is a plot of an exemplary subset of ordered points, which will be used in describing a number of such parameters.

One set of parameter that may aid in the determination of whether a subset of ordered points, such as the exemplary subset of FIG. 22, defines a waving motion is the set of extreme points. The set of extreme points may include those points which are a local maximum or minimum in a particular direction. The direction may be the x-coordinate direction for detection of a back-and-forth horizontal waving motion, or the y-coordinate direction for detection of an up-and-down vertical waving motion. The direction may also be diagonal, which, in some embodiments, requires processing of both the x- and y-coordinates of the points of the subset.

In some embodiments, the first point 2201 and last point 2218 of the subset may be considered extreme points. A point belongs to the set of extreme points if the x-coordinate of the points immediately preceding and following the point being considered is lower than the x-coordinate of the point, thus indicating that the point is at a local maximum 2206$x$, such as is the case for point 2206. Similarly, a point belongs to the set of extreme points if the x-coordinate of the points immediately preceding and following the point being considered is higher than the x-coordinate of the point being considered, thus indicating that the point is at a local minimum 2212$x$, such as is the case for point 2212.

The set of extreme points may be used to provide an indication of whether the subset defines a waving motion by further deriving other parameters from the set of extreme points. The number of extreme points may be used to provide an indication of whether the subset defines a waving motion. For example, in one embodiment, if the number of extreme points is less than a threshold, the subset is determined to not define a waving motion. In another embodiment if the time (or number of points) between two extreme points is found to be within a predetermined range, the subset is determined to define a waving motion. In another embodiment, if the time (or number of points) between the first extreme point and the last point of the subset is greater than a threshold, the subset is determined to not define a waving motion. As mentioned above, each of the parameters may alternatively be one of a number of of analyzed parameters used in the determination.

The set of extreme points may also be used to determine a set of line segments to be used for further analysis to provide an indication of whether the subset defines a waving motion. FIG. 22 also shows a set of line segments 2231, 2232, 2233 fitted to the points between identified successive extreme points. One method of determining a set of line segments based on the extreme points is to fit a line segment to the points between the identified extreme points using a least-square line fitting algorithm.

A number of parameters used in determining whether or not the subset defines a waving motion can be derived from the set of line segments. The angle of each line segment can be used to determine whether or not the detected motion defines a waving motion. For example, for detection of a horizontal back-and-forth motion, if the angle of each line segment does not fall within a predetermined range, the subset of points is determined to not define a waving motion. If the difference between the largest angle and the smallest angle is greater than a threshold, it may be determined that the subset of points does not define a waving motion.

The length of the line segments, or, alternatively, the distance between two extreme points, may be used in the determination of a waving motion. For example, if the length of one of the line segments does not fall within a predetermined range, it may be determined that the subset of points does not define a waving motion.

The center point 2231$o$, 2232$o$, 2233$o$ of each line segment may be calculated using by averaging the x- and y-coordinates of the endpoints, or using another technique known to those skilled in the art, and may be used in the determination of a waving motion. If the distance between any two center points is greater than a threshold, indicating substantial variation in the center points, it may be determined that the subset of points does not define a waving motion. The average location of the subset of points, or subset center 2250, may be calculated using as described above with respect to FIG. 18 and the prospective center, or using another technique known to those skilled in the art, and may also be used in the determination of a waving motion in conjunction with the center points of each line segment. For example, if the distance between a center point 2231$o$, 2232$o$, 2233$o$ and the subset center 2250 is greater than a threshold, it may be determined that the subset of points does not define a waving motion.

As a waving motion is sometimes formed by the back and forth motion of the whole forearm with the hand and elbow in fixed relative position, or a back and forth motion of the hand with the elbow in an absolute fixed position, the curvature of the subset of points, are portions thereof, may also be used to determine if the subset defines a waving motion. In one embodiment, the center locations should be no lower than the two end locations, taking into account the angle of the line. When the waving motion involves the whole forearm, the center locations will be at a similar height of the end points, taking into account of the angle of the line, and when the forearm moves back and forth pivoting at the elbow, the center locations will be higher because the trajectory is a convex curve.

In block 2140 of FIG. 21, an indication of the determination is stored in a memory. The indication may indicate that the subset defines a waving motion or does not define a waving motion. As described above, the orientation of the waving motion may be either vertical or horizontal. The indication of the determination may further indicate whether the waving motion was in a horizontal or vertical direction. In other embodiments, horizontal waving and vertical waving are considered to be two different gestures, with different functionalities.

The method described above may be used to analyze a sequence of ordered points to detect a waving motion. Depending on the parameters and thresholds chosen, the waving motion detected may be any of a number of shapes, a back-and-forth horizontal motion, an up-and-down vertical motion, a diagonal motion, a Z-shape, an M-shape, or an approximation thereof. The method has a number of practical applications. As described, in one application, a video sequence of hand gestures may be analyzed to control a device, such as a television.

Conclusion

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

What is claimed is:

1. A computer-implemented method of detecting a waving motion in a sequence of ordered points, the method comprising:
   receiving the sequence of ordered points;
   selecting a subset of the sequence of ordered points;
   determining a set of successive extreme points from the subset;
   determining a line segment between each pair of successive extreme points;
   determining a center point of the subset and a center point of each of the line segments;
   determining the waving motion based on a distance between the center point of the subset and the center point of each of the line segments is between a first threshold and a second threshold; and
   storing an indication of the waving motion on a memory.

2. The method of claim 1, further comprising preprocessing the sequence of ordered points prior to selecting the subset.

3. The method of claim 2, wherein the preprocessing comprises applying at least one of a median filter or an averaging filter.

4. The method of claim 1, wherein the sequence of ordered points is derived from a video sequence.

5. The method of claim 1, further comprising determining a number of the successive extreme points; and
wherein:
determining the waving motion includes determining when the number of the successive extreme points is greater than a threshold.

6. The method of claim 1, further comprising determining a number of points between pairs of the successive extreme points; and
wherein:
determining the waving motion includes determining when each of the number of points is between a first threshold and a second threshold.

7. The method of claim 1, further comprising determining an angle of each of the line segments; and
wherein:
determining the waving motion includes determining when the angle of each of the line segments is between a first threshold and a second threshold.

8. The method of claim 7, wherein the first threshold and second threshold are predetermined.

9. The method of claim 7, wherein the first threshold and second threshold are based on the determined angles.

10. The method of claim 1, further comprising determining a time span of each of the line segments; and
wherein:
determining the waving motion includes determining when the time span of each of the line segments is between a first threshold and a second threshold.

11. The method of claim 1, further comprising determining a length of each of the line segments; and
wherein:
determining the waving motion includes determining when the length of each of the line segments is between a first threshold and a second threshold.

12. The method of claim 1, further comprising determining when the subset is in a horizontal or vertical orientation, wherein the stored indication is also indicative of the orientation.

13. A system for detecting a waving motion in a sequence of ordered points, the system comprising:
an input module for receiving the sequence of ordered points;
a selection module for selecting a subset of the sequence of ordered points;
a determination module for:
determining a set of successive extreme points from the subset,
determining a line segment between each pair of successive extreme points,
determining a center point of the subset and a center point of each of the line segments,
determining the waving motion based on a distance between the center point of the subset and the center point of each of the line segments is between a first threshold and a second threshold; and
a memory for storing an indication of the waving motion.

14. The system of claim 13, further comprising a camera.

15. The system of claim 13, wherein the system comprises a television, a DVD player, a radio, a set-top box, a music player, or a video player.

16. A system for detecting a waving motion in a sequence of ordered points, the system comprising:
means for receiving the sequence of ordered points;
means for selecting a subset of the sequence of ordered points;
means for determining a set of successive extreme points from the subset;
means for determining a line segment between each pair of successive extreme points;
means for determining a center point of the subset and a center point of each of the line segments;
means for determining the waving motion based on a distance between the center point of the subset and the center point of each of the line segments is between a first threshold and a second threshold; and
means for storing an indication of the waving motion.

* * * * *